US009146695B2

(12) United States Patent
Galloway et al.

(10) Patent No.: US 9,146,695 B2
(45) Date of Patent: *Sep. 29, 2015

(54) METHOD AND SYSTEM FOR DISTRIBUTED RAID IMPLEMENTATION

(71) Applicant: Pivot3, Inc., Spring, TX (US)

(72) Inventors: William C. Galloway, Magnolia, TX (US); Ryan A. Callison, Magnolia, TX (US); Greg J. Pellegrino, Tomball, TX (US); Choon-Seng Tan, Houston, TX (US)

(73) Assignee: PIVOT3, INC., Spring, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/028,286

(22) Filed: Sep. 16, 2013

(65) Prior Publication Data
US 2014/0143490 A1 May 22, 2014

Related U.S. Application Data

(63) Continuation of application No. 13/543,561, filed on Jul. 6, 2012, now Pat. No. 8,621,147, which is a continuation of application No. 13/291,309, filed on Nov. 8, 2011, now Pat. No. 8,261,017, which is a
(Continued)

(51) Int. Cl.
*G06F 12/00* (2006.01)
*G06F 3/06* (2006.01)
*G06F 11/10* (2006.01)

(52) U.S. Cl.
CPC ............ *G06F 3/0689* (2013.01); *G06F 3/0604* (2013.01); *G06F 3/0646* (2013.01); *G06F 11/1076* (2013.01); *G06F 2211/1028* (2013.01)

(58) Field of Classification Search
USPC .......................... 711/114, 111, 100, 154, 169
See application file for complete search history.

(56) References Cited

U.S. PATENT DOCUMENTS

| 5,568,629 | A | 10/1996 | Gentry et al. |
| 6,304,942 | B1 | 10/2001 | Dekoning et al. |
| 6,370,605 | B1 | 4/2002 | Chong, Jr. |
| 6,601,138 | B2 | 7/2003 | Otterness et al. |

(Continued)

FOREIGN PATENT DOCUMENTS

| CN | 1747385 | 3/1996 |
| JP | 5-257611 | 10/1993 |

(Continued)

OTHER PUBLICATIONS

International Search Report and Written Opinion issued for PCT/US2009/046470, mailed on Jul. 21, 2009, 9 pages.
International Search Report and Written Opinion issued for PCT/US2009/046473 mailed on Jul. 14, 2009, 8 pages.
International Search Report and Written Opinion issued for PCT/US2009/048570 mailed on Aug. 5, 2009, 9 pages.
International Search Report and Written Opinion issued for PCT/US2009/048574 mailed on Aug. 20, 2009, 10 pages.
(Continued)

*Primary Examiner* — Midys Rojas
(74) *Attorney, Agent, or Firm* — Sprinkle IP Law Group

(57) ABSTRACT

Embodiments of the systems and methods disclosed provide a distributed RAID system comprising a set of data banks. More particularly, in certain embodiments of a distributed RAID system each data bank has a set of associated storage media and executes a similar distributed RAID application. The distributed RAID applications on each of the data banks coordinate among themselves to distribute and control data flow associated with implementing a level of RAID in conjunction with data stored on the associated storage media of the data banks.

27 Claims, 11 Drawing Sheets

Related U.S. Application Data continuation of application No. 12/479,319, filed on Jun. 5, 2009, now Pat. No. 8,090,909.

(60) Provisional application No. 61/131,270, filed on Jun. 6, 2008, provisional application No. 61/131,314, filed on Jun. 6, 2008, provisional application No. 61/131,291, filed on Jun. 6, 2008, provisional application No. 61/131,290, filed on Jun. 6, 2008, provisional application No. 61/131,379, filed on Jun. 6, 2008, provisional application No. 61/131,312, filed on Jun. 6, 2008.

(56) References Cited

U.S. PATENT DOCUMENTS

| | | | |
|---|---|---|---|
| 6,895,485 | B1 | 5/2005 | Dekoning et al. |
| 7,032,086 | B2 | 4/2006 | Merchant |
| 7,096,316 | B1 | 8/2006 | Karr et al. |
| 7,130,960 | B1 | 10/2006 | Kano |
| 7,366,837 | B2 | 4/2008 | Corbett et al. |
| 7,389,393 | B1 | 6/2008 | Karr et al. |
| 7,412,573 | B2 | 8/2008 | Uratani et al. |
| 7,546,398 | B2 | 6/2009 | Corneli et al. |
| 8,082,393 | B2 | 12/2011 | Galloway |
| 8,086,797 | B2 | 12/2011 | Galloway |
| 8,090,909 | B2 | 1/2012 | Galloway |
| 8,127,076 | B2 | 2/2012 | Galloway |
| 8,140,753 | B2 | 3/2012 | Galloway et al. |
| 8,145,841 | B2 | 3/2012 | Galloway |
| 8,176,247 | B2 | 5/2012 | Galloway et al. |
| 8,219,750 | B2 | 7/2012 | Galloway et al. |
| 8,239,624 | B2 | 8/2012 | Galloway et al. |
| 8,255,625 | B2 | 8/2012 | Galloway et al. |
| 8,261,017 | B2 | 9/2012 | Galloway et al. |
| 8,271,727 | B2 | 9/2012 | Galloway et al. |
| 8,316,180 | B2 | 11/2012 | Galloway et al. |
| 8,316,181 | B2 | 11/2012 | Galloway et al. |
| 8,386,709 | B2 | 2/2013 | Galloway et al. |
| 8,417,888 | B2 | 4/2013 | Galloway et al. |
| 8,527,699 | B2 | 9/2013 | Galloway et al. |
| 8,621,147 | B2 | 12/2013 | Galloway et al. |
| 9,086,821 | B2 | 7/2015 | Galloway et al. |
| 2001/0044879 | A1 | 11/2001 | Moulton et al. |
| 2002/0035667 | A1 | 3/2002 | Brunning, III et al. |
| 2002/0069317 | A1 | 6/2002 | Chow et al. |
| 2002/0069318 | A1 | 6/2002 | Chow et al. |
| 2002/0087751 | A1 | 7/2002 | Chong, Jr. |
| 2003/0014598 | A1 | 1/2003 | Brown |
| 2003/0135709 | A1 | 7/2003 | Niles et al. |
| 2003/0159001 | A1 | 8/2003 | Chalmer et al. |
| 2004/0003173 | A1 | 1/2004 | Yao et al. |
| 2004/0153479 | A1 | 8/2004 | Mikesell et al. |
| 2004/0168018 | A1 | 8/2004 | Aasheim et al. |
| 2004/0177218 | A1 | 9/2004 | Meehan et al. |
| 2004/0221070 | A1 | 11/2004 | Ortega, III et al. |
| 2005/0015700 | A1 | 1/2005 | Hetzler et al. |
| 2005/0050383 | A1 | 3/2005 | Horn et al. |
| 2005/0114350 | A1 | 5/2005 | Rose et al. |
| 2005/0166017 | A1 | 7/2005 | Mann et al. |
| 2006/0010227 | A1 | 1/2006 | Atluri |
| 2006/0129559 | A1 | 6/2006 | Sankaran et al. |
| 2006/0242377 | A1 | 10/2006 | Kanie et al. |
| 2006/0248273 | A1 | 11/2006 | Jernigan et al. |
| 2006/0248379 | A1 | 11/2006 | Jernigan et al. |
| 2006/0271734 | A1 | 11/2006 | Strange et al. |
| 2006/0277383 | A1 | 12/2006 | Hayden et al. |
| 2007/0028044 | A1 | 2/2007 | Hetrick et al. |
| 2007/0073990 | A1 | 3/2007 | Snaman et al. |
| 2007/0094348 | A1 | 4/2007 | Scheidel et al. |
| 2007/0143541 | A1 | 6/2007 | Nichols et al. |
| 2007/0244938 | A1 | 10/2007 | Michael et al. |
| 2007/0271434 | A1 | 11/2007 | Kawamura et al. |
| 2008/0104443 | A1 | 5/2008 | Akutsu et al. |
| 2008/0109601 | A1 | 5/2008 | Klemm et al. |
| 2008/0155191 | A1 | 6/2008 | Anderson et al. |
| 2008/0222633 | A1 | 9/2008 | Kami |
| 2008/0256292 | A1 | 10/2008 | Flynn et al. |
| 2008/0270680 | A1 | 10/2008 | Chang |
| 2009/0006746 | A1 | 1/2009 | Sharma et al. |
| 2009/0138752 | A1 | 5/2009 | Graham et al. |
| 2009/0172335 | A1 | 7/2009 | Kulkarni et al. |
| 2009/0210875 | A1 | 8/2009 | Bolles et al. |
| 2009/0307421 | A1 | 12/2009 | Galloway et al. |
| 2009/0327606 | A1 | 12/2009 | Galloway et al. |
| 2010/0106906 | A1 | 4/2010 | Galloway et al. |
| 2011/0022801 | A1 | 1/2011 | Flynn |
| 2012/0054431 | A1 | 3/2012 | Galloway et al. |
| 2012/0054432 | A1 | 3/2012 | Galloway et al. |
| 2012/0054433 | A1 | 3/2012 | Galloway et al. |
| 2012/0059978 | A1 | 3/2012 | Rosenband et al. |
| 2012/0124286 | A1 | 5/2012 | Galloway et al. |
| 2012/0131383 | A1 | 5/2012 | Galloway et al. |
| 2012/0137069 | A1 | 5/2012 | Galloway et al. |
| 2012/0271997 | A1 | 10/2012 | Galloway et al. |
| 2012/0271998 | A1 | 10/2012 | Galloway et al. |
| 2012/0297136 | A1 | 11/2012 | Galloway et al. |
| 2012/0297137 | A1 | 11/2012 | Galloway et al. |
| 2013/0219120 | A1 | 8/2013 | Galloway et al. |

FOREIGN PATENT DOCUMENTS

| | | |
|---|---|---|
| JP | 5-324579 | 12/1993 |
| JP | 5-334006 | 12/1993 |
| JP | 7-261945 | 10/1995 |
| JP | 2000-76207 | 3/2000 |
| JP | 2006-331076 | 12/2006 |
| JP | 2008-41093 | 2/2008 |
| JP | 2008-107896 | 5/2008 |

OTHER PUBLICATIONS

International Search Report and Written Opinion issued for PCT/US2009/046471 mailed on Dec. 28, 2009, 9 pages.

International Preliminary Report on Patentability issued for PCT Patent Application No. PCT/US2009/046470, mailed on Dec. 16, 2010, issued on Dec. 6, 2010, 8 pages.

International Preliminary Report on Patentability issued for PCT Patent Application No. PCT/US2009/046471, mailed on Dec. 16, 2010, issued on Dec. 6, 2010, 8 pages.

International Preliminary Report on Patentability issued for PCT Patent Application No. PCT/US2009/046473, mailed on Dec. 16, 2010, issued on Dec. 6, 2010, 7 pages.

International Preliminary Report on Patentability issued for PCT Patent Application No. PCT/US2009/048570, mailed on Jan. 13, 2011, issued on Jan. 5, 2011, 8 pages.

Office Action issued for U.S. Appl. No. 12/479,434, mailed May 11, 2011, 13 pages.

International Preliminary Report on Patentability for PCT Patent Application No. PCT/US2009/048574, mailed May 12, 2011, 9 pages.

Office Action issued for U.S. Appl. No. 12/479,360, mailed Jun. 7, 2011, 17 pages.

Office Action issued for U.S. Appl. No. 12/479,319, mailed Jun. 22, 2011, 18 pages.

Office Action issued for U.S. Appl. No. 12/479,403, mailed Jun. 24, 2011, 13 pages.

Office Action issued for U.S. Appl. No. 12/479,377, mailed Jul. 29, 2011, 14 pages.

Notice of Allowance issued in U.S. Appl. No. 12/479,434, mailed Sep. 21, 2011, 9 pages.

Notice of Allowance issued in U.S. Appl. No. 12/479,403, mailed Sep. 30, 2011, 14 pages.

Notice of Allowance issued in U.S. Appl. No. 12/479,319, mailed Oct. 5, 2011, 14 pages.

Notice of Allowance issued in U.S. Appl. No. 12/479,394, mailed Oct. 5, 2011, 8 pages.

Office Action issued in U.S. Appl. No. 13/224,936, mailed Oct. 12, 2011, 8 pages.

Office Action issued in U.S. Appl. No. 12/490,810, mailed Oct. 18, 2011, 21 pages.

(56) References Cited

OTHER PUBLICATIONS

Office Action issued in U.S. Appl. No. 12/479,360, mailed Oct. 25, 2011, 25 pages.
John H. Hartman et al., "The Zebra Striped Network File System," ACM Transactions on Computer Systems, vol. 13, No. 3, Aug. 1995, pp. 274-310.
Notice of Allowance issued in U.S. Appl. No. 12/479,377, mailed Nov. 18, 2011, 8 pages.
Notice of Allowance issued for U.S. Appl. No. 13/224,936, mailed Dec. 14, 2011, 9 pages.
Notice of Allowance for U.S. Appl. No. 12/490,916, mailed Jan. 9, 2012, 5 pages.
Office Action issued in U.S. Appl. No. 13/292,388, mailed Jan. 20, 2012, 6 pages.
Office Action issued for U.S. Appl. No. 13/291,311 mailed Feb. 1, 2012, 12 pages.
Office Action issued for U.S. Appl. No. 12/479,360 mailed Feb. 6, 2012, 8 pages.
Notice of Allowance issued for U.S. Appl. No. 12/490,810, mailed Feb. 16, 2012, 8 pages.
Office Action issued for U.S. Appl. No. 13/291,309, mailed Feb. 24, 2012, 10 pages.
Office Action issued for U.S. Appl. No. 13/366,069, mailed Mar. 13, 2012, 9 pages.
Notice of Allowance issued for U.S. Appl. No. 12/479,360, mailed Apr. 2, 2012, 4 pages.
Office Action issued for U.S. Appl. No. 13/358,306, mailed Apr. 4, 2012, 21 pages.
Supplemental Notice of Allowance for U.S. Appl. No. 12/490,916, mailed Apr. 9, 2012, 4 pages.
Notice of Allowance issued for U.S. Appl. No. 13/291,309, mailed Apr. 12, 2012, 5 pages.
Notice of Allowance issued for U.S. Appl. No. 13/291,311, mailed Apr. 13, 2012, 5 pages.
Supplemental Notice of Allowance issued for U.S. Appl. No. 13/291,309, mailed May 22, 2012, 5 pages.
Corrected Notice of Allowance issued for U.S. Appl. No. 13/291,311, mailed May 22, 2012, 5 pages.
Office Action issued for U.S. Appl. No. 13/364,439, mailed May 25, 2012, 21 pages.
Notice of Allowance issued for U.S. Appl. No. 13/366,069, mailed Jun. 8, 2012, 6 pages.
Corrected Notice of Allowance issued for U.S. Appl. No. 13/291,311, mailed Jun. 21, 2012, 5 pages.
Supplemental Notice of Allowance issued for U.S. Appl. No. 13/291,309, mailed Jun. 22, 2012, 5 pages.
Office Action issued for U.S. Appl. No. 12/914,559, mailed Jun. 25, 2012, 15 pages.
International Search Report and Written Opinion issued for PCT Application No. PCT/US2012/034701, mailed on Jul. 3, 2012, 12 pages.
European Search Report issued for European Patent Application No. 09 759 544.1, mailed on Apr. 5, 2012, 12 pages.
Supplemental Notice of Allowance issued for U.S. Appl. No. 13/291,309, mailed Aug. 2, 2012, 5 pages.
Notice of Allowance issued for U.S. Appl. No. 13/358,306 mailed Aug. 24, 2012, 3 pages.
Notice of Allowance issued for U.S. Appl. No. 13/366,069 mailed Aug. 29, 2012, 4 pages.
Notice of Allowance issued for U.S. Appl. No. 12/914,559, mailed Oct. 16, 2012, 9 pages.
Notice of Allowance issued for U.S. Appl. No. 13/364,439, mailed Oct. 18, 2012, 6 pages.
Office Action and its English translation issued for Chinese Patent Application No. 200980125013.9, mailed Nov. 5, 2012, 20 pages.
Office Action for U.S. Appl. No. 13/543,561, mailed Jan. 29, 2013, 8 pages.
Office Action issued for U.S. Appl. No. 13/093,042, mailed Jan. 14, 2013, 18 pages.
Chinese Office Action issued for Chinese Patent Application No. 200980127589.9, mailed Jan. 10, 2013, 16 pages.
Notice of Allowance issued for U.S. Appl. No. 13/543,561, mailed Apr. 1, 2013, 8 pages.
2nd Notice of Allowance issued for U.S. Appl. No. 13/543,561, mailed Apr. 22, 2013, 5 pages.
Notice of Allowance issued for U.S. Appl. No. 13/093,042, mailed Apr. 24, 2013, 9 pages.
2nd Notice of Allowance issued for U.S. Appl. No. 13/543,561, mailed Jun. 17, 2013, 5 pages.
Office Action issued for Japanese Patent Application No. 2011-512708, mailed May 10, 2013, 11 pages.
Office Action issued for Japanese Patent Application No. 2011-107699, mailed May 10, 2013, 6 pages.
Office Action issued for Japanese Patent Application No. 2011-516637, mailed May 10, 2013, 9 pages.
Kami, Nobuharu et al., "Multilayer-Cooperative, In-service Reconfiguration in IT/NW Systems", Proceedings of the 2007 IEICE General Conference, p. 66, Mar. 7, 2007.
Office Action issued for Japanese Patent Application No. 2011-36454, mailed May 10, 2013, 5 pages.
Office Action issued for U.S. Appl. No. 13/333,615, mailed Jun. 6, 2013, 16 pages.
Office Action issued for Chinese Patent Application No. 200980151742.1, mailed May 31, 2013, 10 pages.
Office Action issued for Chinese Patent Application No. 201110076346.6, mailed Jun. 3, 2013, 9 pages.
Office Action issued for Chinese Patent Application No. 200980125013.9, mailed Jul. 16, 2013, 6 pages.
Final Office Action issued for U.S. Appl. No. 13/750,417, mailed Jul. 22, 2013, 11 pages.
Office Action issued for Chinese Patent Application No. 200980127589.9, mailed Aug. 27, 2013, 5 pages.
European Search Report issued for European Patent Application No. 13 167 831.0, mailed on Sep. 4, 2013, 6 pages.
Office Action issued for Korean Patent Application No. 10-2010-7029904, Nov. 14, 2013, 5 pages.
Office Action issued for Korean Patent Application No. 10-2011-7001053, mailed Nov. 28, 2013, 8 pages.
Final Office Action issued for Japanese Patent Application No. 2011-512708, mailed Dec. 4, 2013, 1 page.
Final Office Action issued for Japanese Patent Application No. 2011-107699, mailed Dec. 4, 2013, 1 page.
Final Office Action issued for Japanese Patent Application No. 2011-36454, mailed Dec. 4, 2013, 1 page.
Final Office Action issued for Japanese Patent Application No. 2011-516637, mailed Dec. 5, 2013, 1 page.
Office Action issued for Korean Patent Application No. 10-2011-7002478, mailed Oct. 30, 2013, 5 pages.
Office Action issued for Israeli Patent Application No. 209992, mailed Jan. 8, 2014, 3 pages.
Office Action issued for Israeli Patent Application No. 209991, mailed Jan. 8, 2014, 4 pages.
Office Action issued for U.S. Appl. No. 13/750,417, mailed Mar. 6, 2014, 13 pages.
IPRP issued for PCT Application No. PCT/US2012/034701, mailed Mar. 27, 2014, 11 pages.
Office Action issued for Israeli Patent Application No. 209571, mailed Apr. 30, 2014, 6 pages.
Office Action issued for U.S. Appl. No. 13/543,565, mailed Aug. 13, 2014, 15 pages.
Office Action issued for U.S. Appl. No. 13/750,417, mailed Jul. 22, 2014, 10 pages.
Office Action issued for U.S. Appl. No. 13/750,417, mailed Sep. 17, 2014, 26 pages.
Final Office Action issued for U.S. Appl. No. 13/543,565, mailed Mar. 2, 2015, 16 pages.
Notice of Allowance issued for U.S. Appl. No. 13/750,417, mailed Mar. 11, 2015, 6 pages.
Office Action issued for U.S. Appl. No. 13/543,565, mailed Jul. 17, 2015, 15 pages.

| | | | |
|---|---|---|---|
| TABLE 550 | 4 BYTES | LV NUMBER | 504 |
| | 4 BYTES | SEGMENT SIZE | 508 |
| | 8 BYTES | SEGMENT COUNT | 512 |
| | 4 BYTES | QUALITY OF SERVICE | 514 |
| | 4 BYTES | RANGE COUNT | 518 |
| 524a INFORMATION FOR RANGE | 4 BYTES | TYPE | 526a |
| | 8 BYTES | START | 530a |
| | 8 BYTES | END | 534a |
| | 2 BYTES | NETWORK RAID | 538a |
| | 2 BYTES | NETWORK RAID SIZE | 542a |
| | 2 BYTES | DISK RAID | 546a |
| | 2 BYTES | DISK RAID SIZE | 552a |
| | 4 BYTES | DATA BANK COUNT | 554a |
| | 4 BYTES | DATA BANK ORDER | 558a |
| | 4 BYTES | DISK COUNT | 562a |
| | 4 BYTES | DISK ORDER | 566a |
| | ⋮ | ⋮ | |
| | 4 BYTES | DISK COUNT | 562an |
| | 4 BYTES | DISK ORDER | 566an |
| 524b INFORMATION FOR RANGE | 4 BYTES | TYPE | 526b |
| | 8 BYTES | START | 530b |
| | 8 BYTES | END | 534b |
| | 2 BYTES | NETWORK RAID | 538b |
| | 2 BYTES | NETWORK RAID SIZE | 542b |
| | 2 BYTES | DISK RAID | 546b |
| | 2 BYTES | DISK RAID SIZE | 552b |
| | 4 BYTES | DATA BANK COUNT | 554b |
| | 4 BYTES | DATA BANK ORDER | 558b |
| | 4 BYTES | DISK COUNT | 562b |
| | 4 BYTES | DISK ORDER | 566b |
| | ⋮ | ⋮ | |
| | 4 BYTES | DISK COUNT | 562bn |
| | 4 BYTES | DISK ORDER | 566bn |
| | ADDITIONAL RANGE ENTRIES | | 524n |

*FIG. 5*

| DISK TABLE 670 | | | |
|---|---|---|---|
| PHYSICAL SEGMENT 1 | LV NUMBER | LOGICAL SEGMENT NUMBER | ADDRESS SPACE | SECTOR STATE |
| PHYSICAL SEGMENT 2 | LV NUMBER | LOGICAL SEGMENT NUMBER | ADDRESS SPACE | SECTOR STATE |
| PHYSICAL SEGMENT 3 | LV NUMBER | LOGICAL SEGMENT NUMBER | ADDRESS SPACE | SECTOR STATE |
| PHYSICAL SEGMENT 4 | LV NUMBER | LOGICAL SEGMENT NUMBER | ADDRESS SPACE | SECTOR STATE |
| PHYSICAL SEGMENT 5 | LV NUMBER | LOGICAL SEGMENT NUMBER | ADDRESS SPACE | SECTOR STATE |
| PHYSICAL SEGMENT 6 | LV NUMBER | LOGICAL SEGMENT NUMBER | ADDRESS SPACE | SECTOR STATE |
| ... | ... | ... | ... | ... |
| PHYSICAL SEGMENT (n) | LV NUMBER | LOGICAL SEGMENT NUMBER | ADDRESS SPACE | SECTOR STATE |
| PHYSICAL SEGMENT (n+1) | LV NUMBER | LOGICAL SEGMENT NUMBER | ADDRESS SPACE | SECTOR STATE |

*FIG. 7*

METHOD AND SYSTEM FOR DISTRIBUTED RAID IMPLEMENTATION

RELATED APPLICATIONS

This application is a continuation of, and claims a benefit of priority under 35 U.S.C. 120 of the filing date of U.S. patent application Ser. No. 13/543,561 by inventors Galloway et al., entitled "Method and System for Distributed RAID Implementation," filed Jul. 6, 2012, which is a continuation of, and claims a benefit of priority under 35 U.S.C. 120 of the filing date of U.S. patent application Ser. No. 13/291,309, by inventors Galloway et al., entitled "Method and System for Distributed RAID Implementation," filed on Nov. 8, 2011, issued as U.S. Pat. No. 8,261,017, which is a continuation of, and claims a benefit of priority under 35 U.S.C. 120 of the filing date of U.S. patent application Ser. No. 12/479,319, by inventors Galloway et al., entitled "Method and System for Distributed RAID Implementation," filed on Jun. 5, 2009, issued as U.S. Pat. No. 8,090,909, which in turn claims a benefit of priority under 35 U.S.C. §119 to provisional patent application No. 61/131,270, by inventors Galloway et al., entitled "Method and System for Distributed RAID Implementation," filed on Jun. 6, 2008, and 61/131,314, by inventors Galloway et al., entitled "Method and System for Data Migration in a Distributed Multi-Processor RAID Subsystem," filed Jun. 6, 2008, and 61/131,291, by inventors Galloway et al., entitled "System and Method for Distributing Read/Write Requests to Optimal SCSI Targets," filed Jun. 6, 2008, and 61/131,290, by inventors Galloway et al., entitled "Method and System for Utilizing Storage in a Storage System," filed Jun. 6, 2008, and 61/131,379, by inventors Galloway et al., entitled "Method and System for Rebuilding Data" filed Jun. 6, 2008, and 61/131,312, by inventors Galloway et al., entitled "Method and System for Placement of Data on Storage," filed Jun. 6, 2008, the entire contents of each are hereby fully incorporated by reference herein for all purposes.

TECHNICAL FIELD

This invention relates generally to the use of storage devices. More particularly, embodiments of this invention relate to implementing RAID on storage devices. Even more specifically, certain embodiments of this invention relate to a distributed implementation of RAID.

BACKGROUND

Data represents a significant asset for many entities. Consequently, data loss, whether accidental or caused by malicious activity, can be costly in terms of wasted manpower, loss of goodwill from customers, loss of time and potential legal liability. To ensure proper protection of data for business, legal or other purposes, many entities may desire to protect their data using a variety of techniques, including data storage, redundancy, security, etc. These techniques may, however, conflict with other competing constraints or demands imposed by the state or configuration of computing devices used to process or store this data.

One method for dealing with these tensions is to implement a Redundant Array of Independent Disks (RAID). Generally, RAID systems divide and replicate data across multiple hard disk drives (or other types of storage media), collectively referred to as an array, to increase reliability and in some cases improve throughput of computing devices (known as a host) using these RAID systems for storage. To a host then, a RAID array may appear as one or more monolithic storage areas. When a host desires to communicate (read, write, etc.) with the RAID system the host communicates as if the RAID array were a single disk. The RAID system, in turn, processes these communications to implement a certain RAID level in conjunction with such communications. These RAID levels may be designed to achieve some desired balance between a variety of tradeoffs such as reliability, capacity, speed, etc. For example, RAID (level) 0 distributes data across several disks in a way which gives improved speed and utilizes substantially the full capacity of the disks, but all data on a disk will be lost if the disk fails; RAID (level) 1 uses two (or more) disks which each store the same data, so that data is not lost so long as one disk survives. Total capacity of the array is substantially the capacity of a single disk and RAID (level) 5 combines three or more disks in a way that protects data against loss of any one disk; the storage capacity of the array is reduced by one disk.

Current implementations of RAID may have a variety of problems. These problems may stem from limitations imposed by the architecture of these RAID systems, such as the fact that in many instances all communications with a RAID system must be addressed to a single server which controls and manages the RAID system. Other problems may arise from the configuration or layout of the data on the disks comprising a RAID system. For example, in certain cases a RAID level must be chosen and storage allocated within the RAID system before the RAID system can be utilized. Thus, the initially chosen RAID level must be implemented in conjunction with the data stored on the RAID system, irrespective of whether that level of RAID is desired or needed. In many cases these existing problems may be exacerbated by the need to use custom hardware or software to implement these solutions, raising the costs associated with implementing such a solution.

Consequently, it is desired to substantially ameliorate these problems.

SUMMARY

Embodiments of the systems and methods disclosed provide a distributed RAID system comprising a set of data banks. More particularly, in certain embodiments of a distributed RAID system each data bank has a set of associated storage media and executes a similar distributed RAID application. The distributed RAID applications on each of the data banks coordinate among themselves to distribute and control data flow associated with implementing a level of RAID in conjunction with data stored on the associated storage media of the data banks.

Specifically, in one embodiment, a volume with an associated RAID level may be created using the distributed RAID system. Each of the distributed RAID applications can then coordinate operations associated with data of that volume such that data associated with that volume or the implementation of the desired RAID level in conjunction with that volume may be stored on the multiple data banks of the distributed RAID system.

By coordinating the implementation of a level of RAID in conjunction with a volume by storing both data of the volume and data associated with the implementation of RAID on multiple data banks using similar distributed RAID applications executing on each of those data banks a number of advantages may be achieved. Namely, different storage volumes may be allotted, with one or more of the volumes implemented in conjunction with different RAID levels. Moreover, as the coordination of storage and the implementation of RAID across the data banks is accomplished using substantially identical distributed RAID applications, in many cases standard or off-the-shelf hardware, such as standard x86 based servers and storage media may be utilized.

Furthermore, by distributing control across each of the data banks of the RAID system, each of the distributed RAID applications on each data bank can execute substantially autonomously. Additionally, some degree of fault tolerance may be inherent in his architecture as one data bank can be lost and the RAID system may still be able to operate in a seamless manner with respect to each of the hosts utilizing the RAID system.

Moreover, as a side effect of embodiments of systems and methods presented herein, improved performance may be achieved as there are fewer performance bottlenecks, increased bandwidth may be available as each host may be coupled to a switch and each data bank coupled to that switch and expansion or contraction of such a distributed RAID system may be accomplished relatively seamlessly.

These, and other, aspects of the invention will be better appreciated and understood when considered in conjunction with the following description and the accompanying drawings. The following description, while indicating various embodiments of the invention and numerous specific details thereof, is given by way of illustration and not of limitation. Many substitutions, modifications, additions or rearrangements may be made within the scope of the invention, and the invention includes all such substitutions, modifications, additions or rearrangements.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore nonlimiting, embodiments illustrated in the drawings, wherein identical reference numerals designate the same components. Note that the features illustrated in the drawings are not necessarily drawn to scale.

FIG. 5 is a block diagram of one embodiment of a table.

FIG. 7 is a block diagram of one embodiment of a table.

DETAILED DESCRIPTION

Figure 1:
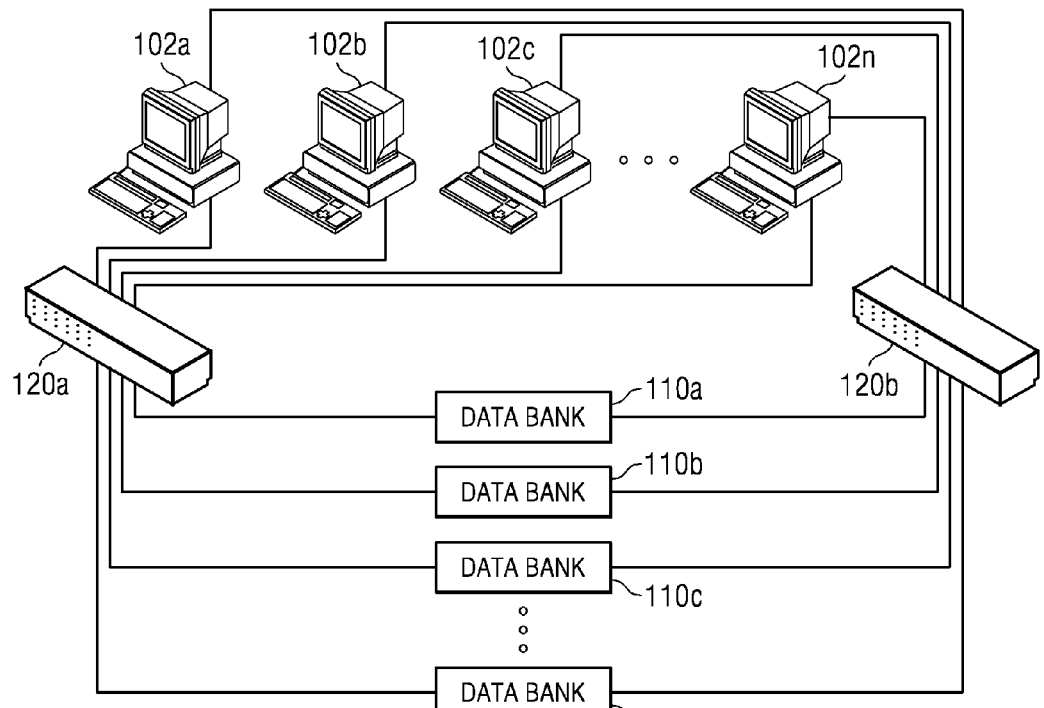
FIG. 1 is a block diagram of one embodiment of an architecture employing a distributed RAID system.

The invention and the various features and advantageous details thereof are explained more fully with reference to the nonlimiting embodiments that are illustrated in the accompanying drawings and detailed in the following description. Descriptions of well known starting materials, processing techniques, components and equipment are omitted so as not to unnecessarily obscure the invention in detail. It should be understood, however, that the detailed description and the specific examples, while indicating preferred embodiments of the invention, are given by way of illustration only and not by way of limitation. Various substitutions, modifications, additions and/or rearrangements within the spirit and/or scope of the underlying inventive concept will become apparent to those skilled in the art from this disclosure. Embodiments discussed herein can be implemented in suitable computer-executable instructions that may reside on a computer readable medium (e.g., a HD), hardware circuitry or the like, or any combination.

Before discussing specific embodiments, embodiments of a hardware architecture for implementing certain embodiments is described herein. One embodiment can include one or more computers communicatively coupled to a network. As is known to those skilled in the art, the computer can include a central processing unit ("CPU"), at least one read-only memory ("ROM"), at least one random access memory ("RAM"), at least one hard drive ("HD"), and one or more input/output ("I/O") device(s). The I/O devices can include a keyboard, monitor, printer, electronic pointing device (such as a mouse, trackball, stylist, etc.), or the like. In various embodiments, the computer has access to at least one database over the network.

ROM, RAM, and HD are computer memories for storing computer-executable instructions executable by the CPU. Within this disclosure, the term "computer-readable medium" is not limited to ROM, RAM, and HD and can include any type of data storage medium that can be read by a processor. In some embodiments, a computer-readable medium may refer to a data cartridge, a data backup magnetic tape, a floppy diskette, a flash memory drive, an optical data storage drive, a CD-ROM, ROM, RAM, HD, or the like.

At least portions of the functionalities or processes described herein can be implemented in suitable computer-executable instructions. The computer-executable instructions may be stored as software code components or modules on one or more computer readable media (such as non-volatile memories, volatile memories, DASD arrays, magnetic tapes, floppy diskettes, hard drives, optical storage devices, etc. or any other appropriate computer-readable medium or storage device). In one embodiment, the computer-executable instructions may include lines of complied C++, Java, HTML, or any other programming or scripting code.

Additionally, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

As used herein, the terms "comprises," "comprising," "includes," "including," "has," "having" or any other variation thereof, are intended to cover a non-exclusive inclusion. For example, a process, process, article, or apparatus that comprises a list of elements is not necessarily limited only those elements but may include other elements not expressly listed or inherent to such process, process, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms. Language designating such nonlimiting examples and illustrations includes, but is not limited to: "for example", "for instance", "e.g.", "in one embodiment".

This application is related to U.S. patent application Ser. No. 12/479,360, entitled "Method and System for Data Migration in a Distributed RAID Implementation" by Galloway et al., filed on Jun. 5, 2009; Ser. No. 12/479,403, entitled "Method and System for Distributing Commands to Targets" by Galloway et al., filed Jun. 5, 2009; Ser. No. 12/479,377, entitled "Method and System for Initializing Storage in a Storage System" by Galloway et al., filed Jun. 5, 2009; Ser. No. 12/479,434, entitled "Method and System for Rebuilding Data in a Distributed RAID System" by Galloway et al., filed Jun. 5, 2009; and Ser. No. 12/479,394, entitled "Method and System for Placement of Data on a Storage Device" by Galloway et al., filed Jun. 5, 2009 all of which are incorporated fully herein by reference.

A brief discussion of context particularly with respect to data storage may now be helpful. As discussed above, RAID systems divide and replicate data across multiple hard disk drives (or other types of storage media), collectively referred to as an array, to increase reliability and in some cases improve throughput of computing devices (known as a host) using these RAID systems for storage. However, current implementations of RAID may have a variety of problems. These problems may stem from limitations imposed by the architecture of these RAID systems, from the configuration or layout of the data on the disks comprising a RAID system or from the need to use custom hardware or software to implement these solutions, raising the costs associated with implementing such a solution. It is desired to substantially ameliorate these problems, among others.

To that end, attention is now directed to the systems and methods of the present invention. Embodiments of these systems and methods provide a distributed RAID system comprising a set of data banks. More particularly, in certain embodiments of a distributed RAID system each data bank has a set of associated storage media and executes a similar distributed RAID application. The distributed RAID applications on each of the data banks coordinate among themselves to distribute and control data flow associated with implementing a level of RAID in conjunction with data stored on the associated storage media of the data banks.

Specifically, in certain embodiments, a volume with an associated RAID level may be created using the distributed RAID system. Each of the distributed RAID applications can then coordinate operations associated with data of that volume such that data associated with that volume or the implementation of the desired RAID level in conjunction with that volume may be stored on the multiple data banks of the distributed RAID system.

By coordinating the implementation of a level of RAID in conjunction with a volume by storing both data of the volume and data associated with the implementation of RAID on multiple data banks using similar distributed RAID applications executing on each of those data banks a number of advantages may be achieved. Namely, different storage volumes may be allotted, with one or more of the volumes implemented in conjunction with different RAID levels. Moreover, as the coordination of storage and the implementation of RAID across the data banks is accomplished using substantially identical distributed RAID applications, in many cases standard or off-the-shelf hardware, such as standard x86 based servers and storage media may be utilized. Many other advantages may also be realized utilizing embodiments presented herein or other embodiments, and such advantages, which may or may not be pointed out in particular detail, will be realized after reading this disclosure.

Turning now to FIG. 1, a block diagram of an architecture for a system which utilizes one embodiment of a distributed RAID system is depicted. Distributed RAID system 100 includes a set of data banks 110, each data bank 110 communicatively coupled to both of switches 120. Each of switches 120 is also communicatively coupled to each host 102, such that a host 102 may communicate with each data bank 110 through a set of paths corresponding to a particular data bank 110, each path comprising one of the switches 120.

The communicative coupling between data banks 110, switches 120 and hosts 102 may be accomplished using almost any transport medium (either wired or wireless) desired, including Ethernet, SCSI, iSCSI, Fibre Channel, serial attached SCSI ("SAS"), advanced technology attachment ("ATA"), serial ATA ("SATA") or other protocols known in the art. Furthermore, the communicative coupling may be implemented in conjunction with a communications network such as the Internet, a LAN, a WAN, a wireless network or any other communications network known in the art.

In one embodiment, then, using a commands protocol, such as iSCSI, SCSI, etc., hosts 102 may communicate with data banks 110 to manipulate data. More particularly, each of data banks 110 comprises storage media (as will be explained in more detail later on herein). Collectively, the storage media in data banks 110 may be virtualized and presented to hosts 102 as one or more contiguous blocks of storage, storage devices, etc. For example, when the iSCSI protocol is utilized the storage media in data banks 110 may be presented to hosts 102 as a SCSI target with, in one embodiment, multiple ports.

Thus, during operation, in one embodiment a host 102 (or a user at a host 102 or interfacing with data bank 110) may request the creation of a volume and specify a level of RAID to be implemented in conjunction with that volume. Data associated with that volume and the implementation of the desired level RAID in association with that volume is stored across data banks 110. The hosts 102 may then access this volume using logical address corresponding to the volume or a portion thereof. In this manner, hosts 102 can utilize created volumes of storage and fault tolerance can be achieved in conjunction with these volumes substantially invisibly to hosts 102.

Figure 2A:
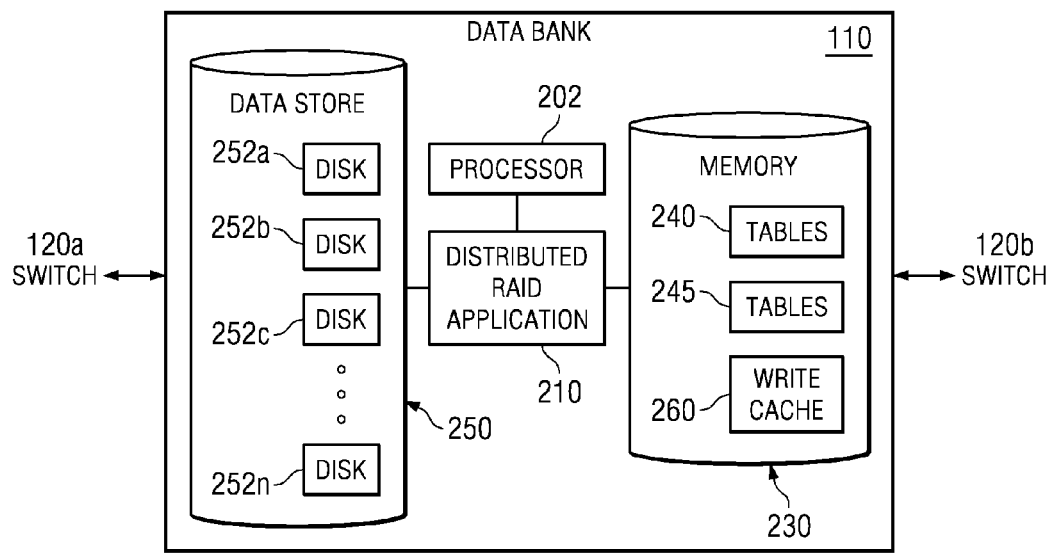
FIG. 2A is a block diagram of one embodiment of a data bank.

The virtualization of storage and the implementation of RAID utilizing data banks 110 may be better understood with reference to FIG. 2A which depicts a block diagram of one embodiment of a data bank 110 computer operable to implement distributed RAID. Here, data bank 110 comprises a data store 250, and a processor 202 operable to execute instructions stored on a computer readable medium, where the instructions are operable to implement distributed RAID application 210. Distributed RAID application 210 may periodically issue heartbeat communications to distributed RAID applications 210 on other data banks 110 to determine if there has been a fault with respect to that data bank 110. If the distributed RAID application 210 determines that another data bank 110 is experiencing a fault it may set one or more fault flags corresponding to that data bank 110. Using these fault flags for each distributed RAID application 210 on each data bank 110 a particular distributed RAID application 210 may determine if a certain data bank 110 is faulty.

Distributed RAID application 210 may also have access (for example, to read, write, issue commands, etc.) to data store 250 comprising one or more storage media, which may for example be disks 252 operating according to almost any protocol known, such as SATA, PATA, FC, etc. where each of the disks 252 may, or may not, be of equal size. Distributed RAID application 210, executing on each of data banks 110 can allow the allocation of and use of volumes using data stores 250 across data banks 110 and the implementation of RAID in conjunction with these volumes utilizing a set of global tables 240 shared between data banks 110, a set of local tables 245 and write cache 260, all of which may be stored in a memory 230 (which may be data store 250 or another memory altogether).

Figure 2B:
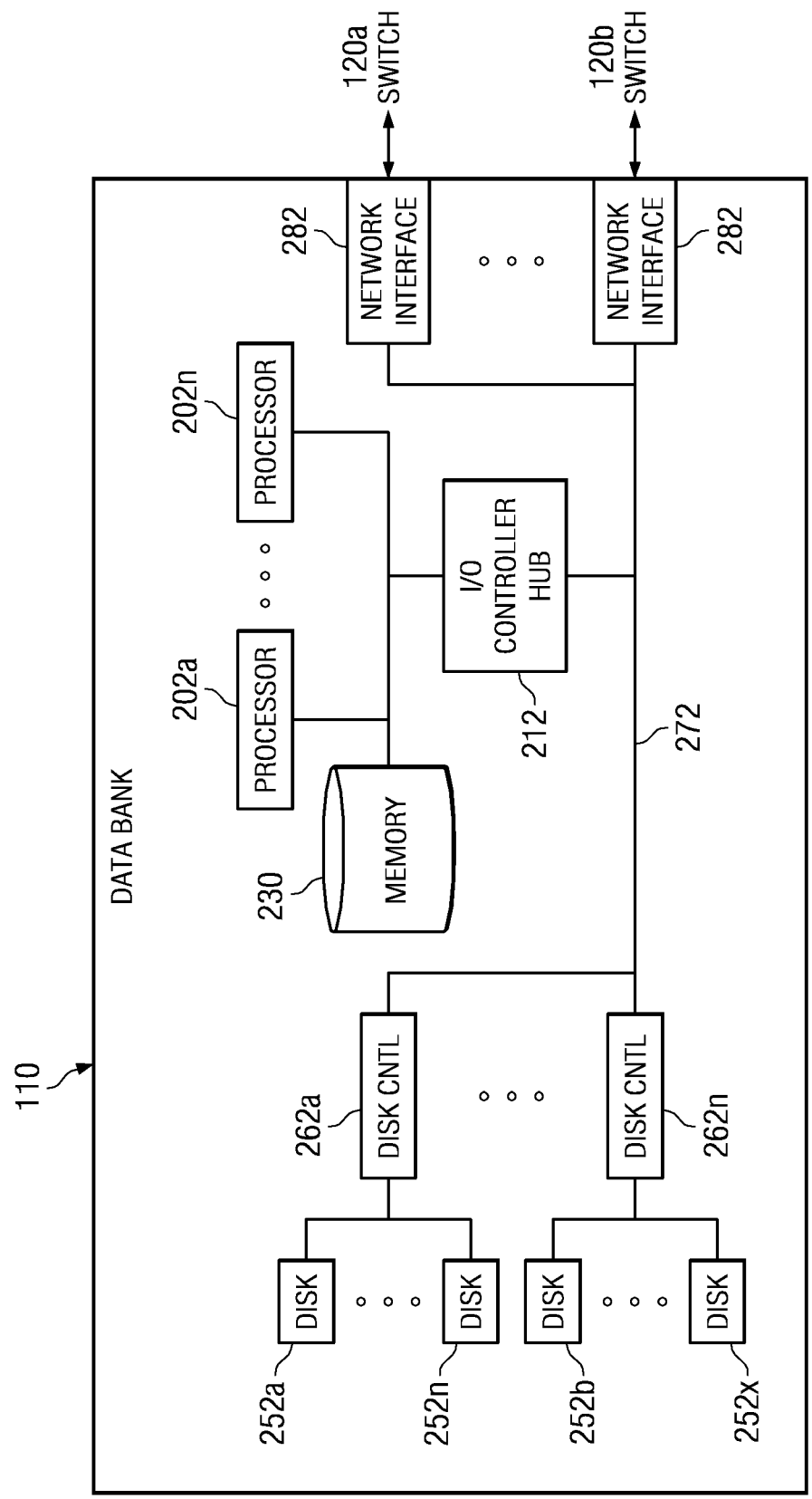
FIG. 2B is a block diagram of one embodiment of an architecture for a data bank.

FIG. 2B depicts a block diagram of one embodiment of a hardware architecture which may be used to implement data bank 110 computer operable to implement distributed RAID. In this architectural example, data bank 110 comprises one or more processors 202 which may adhere to the Intel x86 architecture or some other architecture altogether and a memory 230 coupled through a bus to I/O controller hub 212, which in one embodiment may be a southbridge chip or the like. The I/O controller hub 212 may, in turn, be coupled to and control a bus 272 such as a PCI-X bus, PCI-express bus, etc. Coupled to this bus 272 are one or more disk controllers 262 such as, for example, an LSI 1068 SATA/SAS controller. Each of these disk controllers 262 is coupled to one or more disks 252, where collectively these disks 252 may comprise data store 250. Additionally, one or more network interfaces 282 may also be coupled to bus 272. These network interfaces 282 may be network interfaces (such as Ethernet, etc.) which are included on motherboards, may comprise one or more network interface cards configured to interface via one or more protocols such as Ethernet, fibre channel, etc. or may be some other type of network interface such that data bank 110 may communicate with switched 120 through these network interfaces 282.

Figure 3:
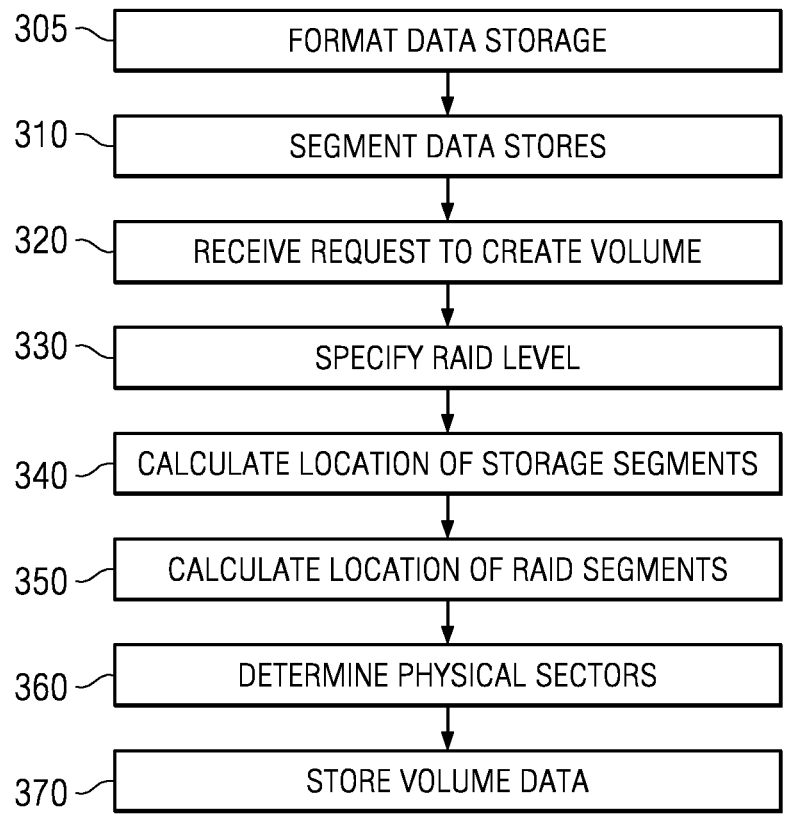
FIG. 3 is a flow diagram of one embodiment of a method implemented by a distributed RAID system.

Moving now to FIG. 3, one embodiment of a method for the allocation of volumes and the laying out of data associated with these volumes in data stores 250 across data banks 110 is illustrated. Initially, before volumes are to be allocated on a disk 252 of data store 250, the disk 252 may be formatted at step 305. As discussed above, in order to have the ability to easy and simply recover from any failures redundancy data may need to be accurate relative to any corresponding stored data. In many cases, this may entail that disks 252 utilized to store a volume be formatted by calculating redundancy data from the current data in the areas on disk 252 where portions of a volume are to be stored, even though data stored at these areas may currently be garbage values. These calculations may consume an undesirably large amount of time.

Furthermore, in a distributed RAID environment such as that detailed with respect to FIG. 1, other problems may present themselves. More specifically, as different portions of a volume may be stored on different data banks 110 and redundancy data corresponding to the volume may also be stored on various data banks 110, accomplishing this type of formatting may additionally require a great deal of communication between distributed RAID applications 210 on data banks 110, consuming processor cycles and communication bandwidth.

Thus, in one embodiment, to ensure that redundancy data corresponding to an area of a disk where data of a volume is to be stored is accurate relative to the area of disk 252 where that data of the volume is to be stored, a zero value may be written to the areas on disks 252 where data corresponding to the volume is to be stored and the areas on disk 252 where redundancy data is to be stored. By zeroing out both the areas of a disk 252 where data of a volume is to be stored and areas of disks 252 where redundancy data is to be stored it can be guaranteed that any data of the volume can be recreated from its corresponding redundancy data.

Zeroing disks 252 may have other advantages. Namely that no complex calculations may need to be performed to determine redundancy data and no communications between distributed RAID applications 210 may be to achieve relative accuracy between areas where a volume is to be stored and redundancy data corresponding to those areas.

Importantly, by zeroing out areas of disks 252 for use with a volume and its corresponding redundancy data a significant delay in the usability of RAID system 100 may be avoided. These advantages may be attained through the use of a process which substantially continuously during operation zeros out unallocated areas of disks 252 resulting, for example, from the initial use of distributed RAID system 100, the installation of new disks 252, the deletion of a volume, etc. In these instances, currently unallocated (i.e. not currently allocated) areas of disks 252 on each of data banks 110 may have zeros written to them (referred to as "zeroing" the area).

The unallocated areas of disks 252 which have been zeroed may be tracked such that when a command corresponding to a portion of a volume or redundancy data associated with a portion of a volume is received at a data bank 110 to which that portion is assigned, distributed RAID application 210 may check to determine if that portion has been assigned a corresponding area of disks 252 on data bank 110 where that portion has been assigned. If no corresponding area of disks 252 on data bank 110 has been assigned, distributed RAID application 210 may select an area of disks 252 which has been zeroed and assign this area of disks 252 to the portion of the volume or corresponding redundancy data.

By simultaneously zeroing out any unassigned areas which have not previously been zeroed and waiting until a command corresponding to a portion of a volume or redundancy data is received to assign a zeroed area of disks 252 to that portion distributed RAID system 100 may operate substantially immediately without a long involved formatting process and new disks 252 may be added and volumes deleted or freed relatively unobtrusively to the operation of distributed RAID system 100.

It will be noted, therefore, after reading the above that step 305 in which the disks 252 are formatted may be accomplished before, during or after the creation of a volume with respect to distributed RAID system 100 and that the placement of step 305 (and all other steps in all the flow diagrams herein) implies no order to the steps. As will also be noted after a thorough review of the rest of the steps in FIG. 3 and the remainder of the disclosure, a volume may be created and portions of the volume and redundancy data corresponding to the volume assigned to a data bank 110 before physical areas on disks 252 on these data banks 110 have been assigned to store the portions of the volume or redundancy data and that, furthermore, the zeroing of the physical areas on disks 252 used to store the data corresponding to such portions may occur before the creation of the volume or after the creation of the volume but before these physical areas are assigned to corresponding portions of the volume or redundancy data (as discussed in more detail later).

These locations may be better explained with reference to the concept of a segment which may be utilized by embodiments of a distributed RAID application 210, where a segment may be the size of 2048 logical block addresses (LBAs) (or some other size) and the size of the logical block address corresponds to the sector size of a disk 252. Disks 252 in the data store 250 on each of data banks 110 may therefore be separated into equal size segments (for example, 1 MB) at step 310. These segments may correspond to one or more contiguous data blocks of a disk drive 252. Therefore, when a user or host 102 requests the creation of a volume from distributed RAID application 210 at step 320 and specifies a level of RAID which will be used in conjunction with that volume at step 330, a number of these segments corresponding to the requested size of the volume plus the number of segments desired to implement the desired level of RAID in conjunction with the volume may be assigned to the volume at step 340.

Thus, the volume comprises a number of segments (also referred to as logical segments), where each of these segments may be associated with a particular data bank 110 such that the data bank 110 may be assigned to manage that segment of the volume. This segment may, for example, may be the size of 2048 logical block addresses (LBAs), where the size of the logical block address corresponds to the size sector size of a disk 252 (other arrangements and sizes will also be possible). In most cases the physical storage comprising that segment of the volume will be stored in the data store 250 of the data bank 110 which manages that segment, however, in other cases the data corresponding to that segment may be stored in the data store 205 of a different data bank 110 (in other words, in certain cases the data bank 110 comprising the distributed RAID application which manages that segment may be distinct from the data bank 110 comprising the data store 250 which stores the data corresponding to that segment).

In one embodiment, the allocation of segments to data banks 110 corresponding to a particular volume may be accomplished by determining a random permutation of the set of data banks 110 corresponding to the distributed RAID system 100. Thus, if there are six data banks a random permutation of size six, where the random permutation comprises each of the data banks may be determined such that the segments may assigned to each of the data banks consecutively in the order of the random permutation.

For example, suppose there are four data banks 110 in a distributed RAID system (call them data bank1, data bank2, etc.). A random permutation of data bank2, data bank4, data bank1 and data bank3 may be determined. In this case, the first segment corresponding to a volume is on data bank2, the second segment may be on data bank4, the third on data bank1, the fourth on data bank 3 and the fifth back again on data bank 4. In this way, the location of a particular segment corresponding with the volume may be determined mathematically if the random permutation corresponding to the volume is known.

As mentioned the user may specify that a level of RAID is to be implemented in conjunction with a volume at step 330. In this case, distributed RAID application 210 may ensure that any data corresponding to the implementation of RAID in conjunction with a volume is stored at an appropriate location at step 350 such that the RAID information is appropriately distributed across data banks 110 to ensure that the desired level of RAID is achieved.

For example, if it is desired to implement RAID 5 in conjunction with a volume, distributed RAID application 210 may determine a desired RAID parity group size (for example, based on a user configured RAID set or otherwise determined). This determination may be based on the number of data banks 110 in the distributed RAID system and may, in one embodiment, be one less than the number of data banks 110 (plus an additional one to account for the parity data).

To illustrate, if there were five data banks 110, for every four segments which store data associated with the volume (referred to as data segments), one segment would be dedicated to parity and the parity for the four segments calculated and stored in this parity segment, where the parity segment would be dedicated in a data bank 110 whose data store 250 does not comprise the data segments from which the parity data of the parity segment was calculated.

At this point, each segment corresponding to a logical volume has been assigned to a particular data bank 110 and any segments 100 to be utilized to store RAID data corresponding to the volume (referred to herein interchangeably as redundancy segments or parity segments, without loss of general applicability to the use of the segment to store any type of redundancy data associated with the implementation of any level of RAID in conjunction with a volume) have also been assigned to a data bank 110, however, physical sectors of the disks 252 of the data stores 250 of the data banks may not have yet been assigned to store the data corresponding to those segments. Thus, at step 360 physical segments of disks 252 on the data bank 110 to which a logical segment of the volume has been assigned may be determined and assigned to the logical segments. This segment mapping may be stored in the local tables 245 of each data bank 110. This assignment may, as mentioned earlier, take place at some later point, for example, when a command first attempts to write a logical segment.

When making this assignment, in one embodiment the areas different performance characteristics of disks 252 may be accounted for relative to the accessed logical segment. In other words, disks 252 may have segments which are more efficiently accessed than other segments of the same disk. Therefore, in one embodiment it may desirable to assign physical segments of a disk 252 based upon criteria associated with the logical segment. The characteristics may include for example, such things as a quality of service designation associated with a volume corresponding to the logical segment, a number of accesses to the volume comprising the logical segment, etc.

At step 370, then, information corresponding to the volume may be stored, such that the location of segments corresponding to the volume, or segment corresponding to the implementation of RAID in conjunction with the volume, may be determined from this stored information. This stored information (collectively referred to as mapping data) may therefore include an identification for the volume, the random permutation corresponding to the volume (for example, indicating the order of data banks 110 on which the segments are located) and the parity group size of any RAID implementation (for example, if the volume corresponds to a 4+1 RAID set, a 7+1 RAID set, if RAID 1 is implemented, etc.). This data may be stored, for example, in global tables 240 such that it can be communicated to other distributed RAID applications 210 on other data banks 110 to ensure that at least a portion of the set of tables 240 associated with each distributed RAID application 210 remains substantially consistent and the location.

Figure 4:
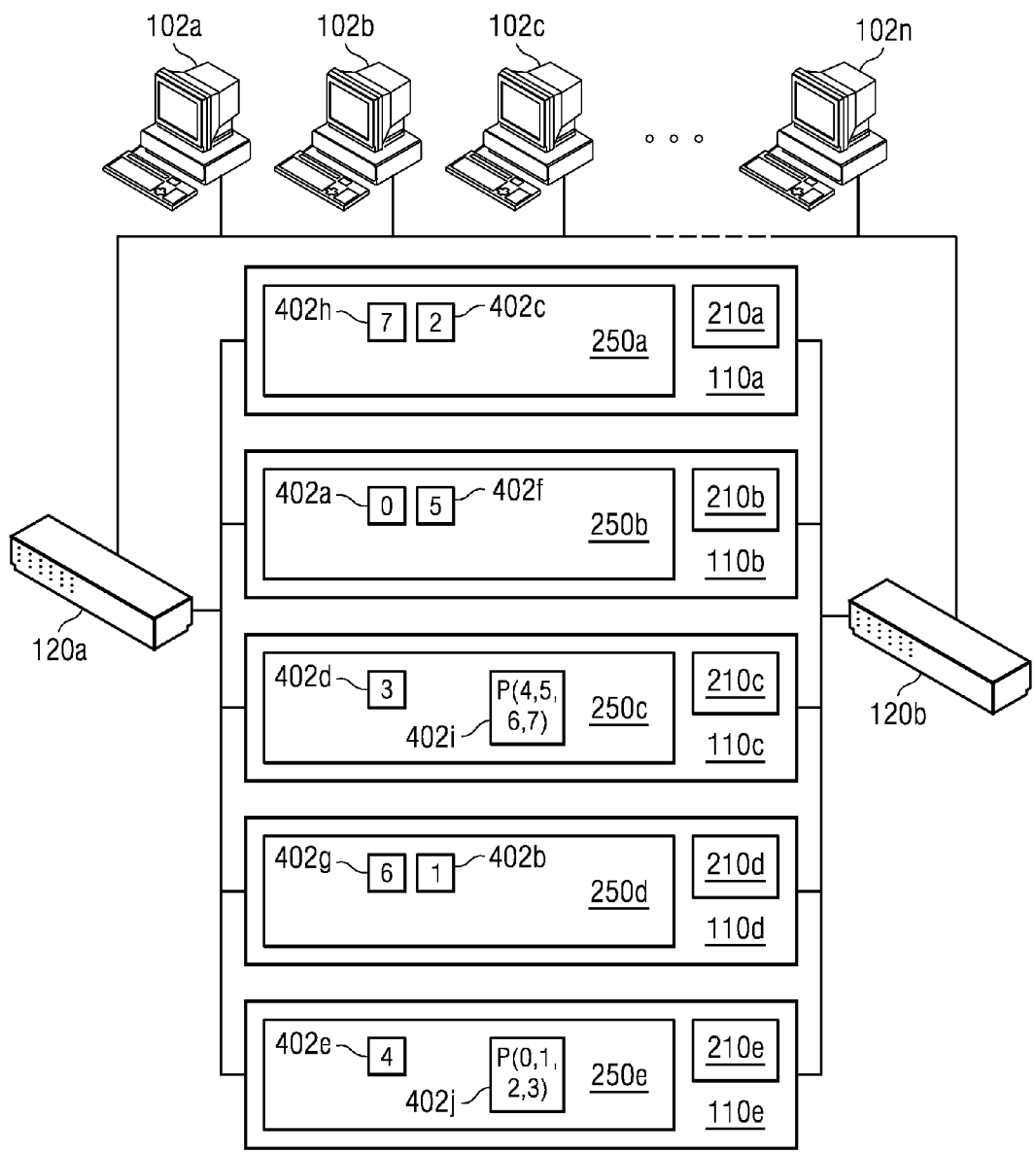
FIG. 4 is block diagram of an example of one embodiment of an architecture employing a distributed RAID system.

The above description may be better understood with reference to FIG. 4 which depicts one example of one embodiment of a distributed RAID system with five data banks 110. Here, each data store 250 of each data bank 110 has been laid out as a set of equally sized segments 402, which for purposes of this example will be assumed to be 1 MB in size. Suppose, now that a host 102 requests a volume of 8 MB with RAID level 5 from distributed RAID application 210b on data bank 110b. In this case, distributed RAID application 210b may determine that eight segments 402 are required for the data portion of the volume while two segments 402 segments may be required to store the redundancy data for the volume in conjunction with implementation of the desired RAID level for the volume. Distributed RAID application 210b may then determine a random permutation for the volume. For purposes of this example, assume that the random permutation is: data bank 110b, data bank 110d, data bank 110a, data bank 110c, and data bank 110e. Thus, data bank 110b may be assigned segment 402a, the first segment of the requested volume, data bank 110d may be assigned segment 402b, the second segment of the requested volume, data bank 110a may be assigned segment 402c, the third segment of the requested volume, data bank 110c may be assigned segment 402d, the fourth segment of the requested volume and data bank 110e may be assigned segment 402e, the fifth segment of the requested volume. The assignment then begins again with the first data bank 110 of the random order such that data bank 110b may be assigned segment 402f, the sixth segment of the requested volume, data bank 110d may be assigned segment 402g, the sixth segment of the requested volume and data bank 110a may be assigned segment 402h, the eighth segment of the requested volume.

Once the data segments 402a-402h for storing data associated with the volume have been assigned, distributed RAID application 210b may assign segments 402 for any data associated with the implementation of that RAID level. In this example, as RAID 5 is desired with respect to the volume, distributed RAID application 210b may determine that as five data banks 110 are being utilized a (4+1) parity set may be desired. Distributed RAID application 210b may then determine that to store the parity to implement RAID 5 in conjunction with eight segments 402 an additional two segments 402 may be needed.

Furthermore, it may be desired that the parity created utilizing a particular set of data segments 402 will not be stored on a data bank 110 having any of those set of data segments 402 in its data store. Thus, distributed RAID application 210b may also determine a location where each of the parity segments will be allocated based on the determined RAID parity group size, the location of the first data segment 402a, etc. Here, parity segment 402i which will store the parity data corresponding to the data stored in data segments 402a, 402b, 402c and 402d will be allocated in data store 250c of data bank 110c while parity segment 402j which will store the parity data corresponding to the data stored in data segments 402e, 402f, 402g and 402h will be allocated in data store 250e of data bank 110e. Notice here that the parity segments 402i, 402j which will store the parity information associated with the implementation of RAID in conjunction with the volume comprising data segments 402a-402h are laid out and sized substantially identically to as those segments 402a-402h which store the data associated with the volume.

Thus, when a host 102 accesses the volume, a request with a logical address corresponding to the first data segment of the volume may correspond to data segment 402a on data bank 110b, a request with a logical address corresponding to the second data segment of the volume may correspond to data segment 402b on data bank 110d, etc. Notice here, that the allocated data segments 402a-402h may reside on different data banks 110 and that the location of any allocated data segment 402a-402h may be determined using the random permutation associated with that volume (for example, as stored in global tables 240 at data banks 110). As discussed above, however, data stores 250 on data banks 110 have been virtualized, thus the requesting host may not be aware of the location of the data segments 402 in data stores 250, that multiple data stores 250 exist, that data stores 250 are spread across multiple data banks 110, etc. Host 102 believes it is addressing a single contiguous volume.

It will be apparent that the location of the data segments 402 on data banks 110 (and the corresponding random permutation of data banks 110) in this example is for purposes of illustration and that the data segments 402 of a volume may be located on any of data stores 250 on any of the data banks 110 according to almost any random, or other, permutation. Furthermore, it will be noted that while each of segments 402 is in this example 1 MB, these may be of any size without loss of generality and that a 1 MB size has been chosen solely for ease of illustration.

As can be seen from the above description then, the location of a particular data segment 402 or parity segment 402 can be determined algorithmically (for example, using the same random permutation used to assign segments for the volume, locate the parity segments for the volume, etc.) using the random permutation associated with the volume and the RAID parity group size. Thus, the information may be stored in conjunction with an identification corresponding to the volume, for example in set of global tables 240. Furthermore, these global tables 240 may be communicated between data banks 110, or otherwise updated, such that at least portions of the set of global tables 240 in each of the data banks 110 may be kept substantially consistent.

It may be helpful here to briefly delve into more detail regarding global tables 240 associated with distributed RAID application 210. As discussed, in one embodiment, global tables 240 may store information associated with volumes created by distributed RAID application 210 where those tables 240 can be used to determine a data bank 110 associated with a data segment within that volume or where a parity segment associated with a data segment corresponding to that volume is located. Global tables 240 may therefore comprise a set of tables, each table corresponding to a volume implemented with respect to databanks 110. In particular, one of these tables 240 may contain data which may be used to identify a data bank 110 whose data store 250 comprises a certain segment of a volume. Specifically, this table may be used to correlate a logical address associated with a volume with the data bank 110 where the segment (data, redundancy, etc.) corresponding to that logical address is stored.

FIG. 5 depicts a graphical representation of one embodiment of this type of table, where each volume may have an associated instance of such a table associated. Table 550 includes entries for LV number 504, segment size 508, segment count 512, quality of service (QOS) 514, range count 518, information for range entries, including in the embodiment depicted a first range 524a and a second range 524b and any additional range entries 524n.

LV number 504 is a unique number used to identify a particular volume, segment size 508 corresponds to the size of the segments used to implement the volume, segment count 512 corresponds to the number of segments corresponding to the logical volume (for example, both the number of data segments and redundancy segments, just the number of data segments, etc), QOS 514 indicates the quality of service which it is desired to implement with respect to the volume (note that this QOS indicator may indicate a priority to be given to that volume relative to other volumes stored on data banks 110) and range count 518 indicates a number of ranges associated with the volume, while range entries 524 each correspond to one of those ranges.

A range may correspond to a particular data bank 110 order and RAID implementation. Multiple ranges may be utilized to implement a volume for a variety of reasons. Specifically, for example, multiple ranges may be utilized in conjunction with a volume because different data stores 250 at different data banks 110 may have different amounts of storage in data store 250 available for use. This may lead to a situation where for example, for a first range of a volume all data banks 110 may be utilized in conjunction with a first RAID implementation while in a second range of a volume fewer than all the data banks 110 available may be utilized in conjunction with a second RAID implementation (where the first and second RAID implementations may, in fact, be different levels than one another). Each of these ranges may therefore correspond to segments laid out according to different data bank 110 orders (for example, random permutations, etc.), having a different number of data banks 110 available for use, a different type of RAID, etc.

To illustrate using a concrete example, brief reference is made back to FIG. 4. Suppose that the volume of 8 MB with RAID level 5 is laid out as shown, where the data segments are laid out according to the order data bank 110b, data bank 110d, data bank 110a, data bank 110c, and data bank 110e and RAID 5 is implemented in conjunction with the volume utilizing a (4+1) parity set may be desired with the parity segments assigned in data store 250c of data bank 110c and data store 250e of data bank 110e.

Now suppose that it is requested to add an additional 3 MB to this volume. However, suppose in this instance that data stores 250 of data banks 110e, 110c and 110d have no more room. Thus, in this case the only solution may be to allocate the additional desired 3 MB between data banks 110a and 110b which have remaining storage in data stores 250. Furthermore, as only two data banks 110 may be available for use it may only be possible to utilize a RAID level of 1 instead of RAID 5 as utilized with the first 8 MB of the volume. Thus, in this case the first 8 MB of the volume may correspond to a first range, and have a first range entry in a table corresponding to the volume with a first set of values while the next 3 MB of the volume may correspond to a second range, and have a second range entry in a table corresponding to the volume with a second set of values. As may be apparent after reading this disclosure, this type of occurrence may occur with some frequency.

Returning to FIG. 5, to deal with these types of situations, among others, each range of a volume may have an entry in a table 550 such that the location of segments in that particular range may be determined from the range entry corresponding to that range. Entries 524 for each of the ranges of the volume corresponding to the table 550 are associated with range count 518. In one embodiment, range count 518 may correspond to the number of ranges of a volume such that the number of range entries 524 corresponds to the range count 518. While only range entries 524a and 524b are shown it will be noted that the number of range entries 524 in a table will depend on the number of ranges corresponding to the volume to which that table corresponds. Thus, if a volume is divided into three ranges, there will be three range entries 524 in table 550 such that there is a range entry 524 comprising information for each range of the volume corresponding to table 550.

Information for a range entry 524 includes type 526, start 530, end 534, network RAID 538, network RAID size 542, disk RAID 546, disk RAID size 550, databank count 554, databank order 558 and a disk count 562 and disk order 566 corresponding to each data bank 110 used to store segments associated with range 524 (in other words there will be a disk count 562 and disk order 566 equal to databank count 554 of that range entry 524). Type 526 describes the type of the range corresponding to information for range entry 524: for example, normal, source (SRC), destination (DST) or other type of range. Start 230 is the first logical segment address of the range of the volume corresponding to range entry 524. End 234 is the last logical segment address of the range corresponding to information for the range of the volume corresponding to range entry 524. Other arrangements are also possible, for example, end 524 may be a count which is the maximum number of segments or blocks in the range, etc.

Databank count 554 may correspond to the number of data banks 110 on which the range corresponding to the range entry resides, databank order 558 may be the order in which segments in that range were assigned to data banks 110 while network RAID 538, network RAID size 542, disk RAID 546 and disk RAID size 552 may correspond to the type of RAID implemented in conjunction with the range of the volume corresponding to range entry 524.

Network RAID 538 is the type of RAID being implemented in association with the volume corresponding to the table 550, for example, RAID 0, RAID 1 or RAID 5 or other RAID types. Network RAID Size 542 is the parity group size of the RAID type used in the range. The Network RAID Size 542 may be limited by the number of data banks 110 in the range to be less than or equal to the number of databanks in the range corresponding to information for range 524. Disk RAID 546 is the type of RAID being implemented across disks in the databanks in the range. Disk RAID size 552 may be the parity group size of the RAID type used across the disks 252 in the data store 250 of each data bank 110 and may be limited to be less than or equal to the number of disks in the databank. In embodiments, RAID across the disks in the databanks 110 in the range is optional and may or may not be used. In such embodiments, either Disk RAID 546, Disk RAID Size 552 or both may not be used or may be omitted.

Data bank count 554 is the number of databanks in the range and Databank order 558 is the order in which RAID is implemented (for example, striped) across the data banks 110 in the range. For example, data banks 110 may have data corresponding to the logical addresses of the volume saved in a certain order and databank order 558 corresponds to this order. Disk count 562 is the number of disks within a data bank 110 of the range and disk order 566 is the order in which RAID is implemented across disks of a particular databank 110. For example, disks 252 may have segments saved to them in a certain order and disk order 566 is the order in which segments are stored across disks 252 in a data bank 110. Thus, for each databank 110 used to store segments of the range associated with the range entry 524 there will be a corresponding disk count 562 and disk order 566 (in other words the number of disk counts 562 and disk orders 566 will, in one embodiment, be equal to databank count 554 of that range entry 524). In embodiments, RAID across disks 252 in the data banks 110 is optional and may not be used. It will be noted that while table 550 has been described with specificity, this description is by way of example, not limitation and other forms of table 550 may be utilized. For example, a virtual table may be used instead of table 550 and may explicitly list the segment 402 and data bank 110 corresponding to each logical address.

Thus, as discussed earlier, information in table 550 may be used to identify a data bank 110 comprising a data segment 402 corresponding to a logical address (referenced by a host 102 in a command or in any other context). For example, knowing the size of segments 402 and using start 530, end 534, the range entry 524 corresponding to the address, etc., the particular data bank 110 corresponding to a logical address of the volume can be determined.

While one or more portions of tables 240 may be substantially identical across all data banks 110 and may describe one or more logical volumes which span one or more data banks 110 as described above, other tables 245 on a data bank 110 may be distinct to the data bank 110 to which it corresponds (for instance, table 245 may be unique to the data bank 110 on which the corresponding distributed RAID application 210 is executing). This table 245 may comprise data pertaining to each disk 252 contained in the data store 250 of the corresponding data bank 110 and may comprise information on where information is stored on or among disks 252 of the data store, for example, the sector of a disk 252 where a segment 402 assigned to the data bank 110 is located in data store 250.

Figure 6:
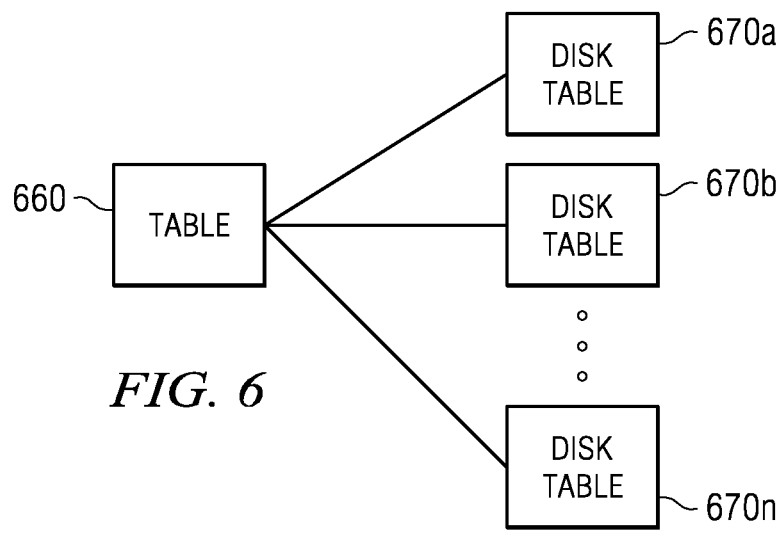
FIG. 6 is a block diagram of one embodiment of a table.

In FIG. 6 a graphical representation of one embodiment of this type of table is depicted. Table 660 may be stored at a particular data bank 110 and comprise multiple disk tables 670, each of the disk tables 670 corresponding to a disk 252 of the data store 250 within that data bank 110 and listing the location of the segments stored within that disk 252. More specifically, in most cases disks 252 are divided into physical sectors, each physical sector having a corresponding address or range of addresses.

A disk table 670 may be a mapping table which can be utilized to determine the location of a sector of a disk 252 of the data bank 110 where a segment of a volume is stored. Thus, using a table 670 the address of a sector on a disk 252 corresponding to a segment of a volume can be determined. Furthermore, the table may contain one or more flags or descriptive bits per entry corresponding to a segment or sector of the disk, describing the sector or segment stored at that sector.

Referring now to FIG. 7, a graphical representation of one embodiment of a disk table 670 is depicted. Disk table 670 has multiple entries, each entry corresponding to a physical segment of the corresponding disk such that the entries of disk table 670 describe the physical segments of the disk 252. Each entry in disk table 670 may also include one or more flags or bit fields describing the physical segment or segment of the volume stored at the corresponding sector. More particularly, as shown in FIG. 7, in one embodiment entries in disk table 670 include fields for a logical volume (LV) number, logical segment number, address space and sector state. LV number identifies the logical volume to which data stored at that physical segment corresponds. Logical segment number identifies the segment of the logical volume corresponding to that data. Address space identifies the segment stored as 'data' or 'redundancy'. A value of 'data' may indicates that data is stored at the sector represented by the entry, whereas a value of 'redundancy' indicates that the information stored at the sector may be used for RAID data protection and, depending upon the RAID level, may be redundant data, mirrored data or parity information. Sector state indicates the state of the segment as being 'allocated', 'zeroed' or 'dirty'. 'Allocated' indicates the segment has been allocated and may comprise valid data. 'Zeroed' indicates the segment has been zeroed out by writing zeros to the segment and 'dirty' indicates the segment may comprise garbage are otherwise unusable or undesirable values, for example because the segment has not been zeroed out or allocated, may be storing random bits or data. In one embodiment, for example, for a new disk all segments of the disk may be marked as dirty in a disk table corresponding to the new or newly added disk.

After reading the above description of the tables it will be apparent that distributed RAID application 210 may utilize the global tables 240 to determine which segment corresponds to a logical address of a volume, on which data bank 110 segments corresponding to a volume (either data or redundancy segments) are located, which segment of a volume corresponds to a logical address of a volume, where RAID data (parity data, mirror data, other types of redundancy data, etc.) associated with a segment of a volume is located, which disk 252 on a particular databank 110 comprises a segment or other information regarding volumes, segments, or disks 252 corresponding to that particular data bank 110 or other information regarding volumes, segments 402, data banks 110, RAID data, etc.

Similarly, distributed RAID application 210 on each individual data bank 110 may use local tables 245 on that data bank 110 to determine where on that data bank 110 (which sector(s) of disk 252, etc.) a particular segment is located or other information regarding volumes, segments, or disks 252 corresponding to that particular data bank 110.

Using the combination of the global table 240 shared between data banks 110 and the local tables 245 corresponding to each individual data bank 110 then, certain operations may be performed by the distributed RAID applications 210 on data banks 110 in cooperation with one another. These types of operations will now be discussed in more detail. Specifically, one embodiment of the implementation of a READ command and a WRITE command on a volume where RAID level 5 has been implemented in conjunction with the volume will now be discussed in more detail followed by concrete examples of the implementation of these commands with respect to an example distributed RAID system. It will be noted how other types of embodiments, commands, RAID levels, etc. may be implemented after a thorough review of this disclosure.

Figure 8:
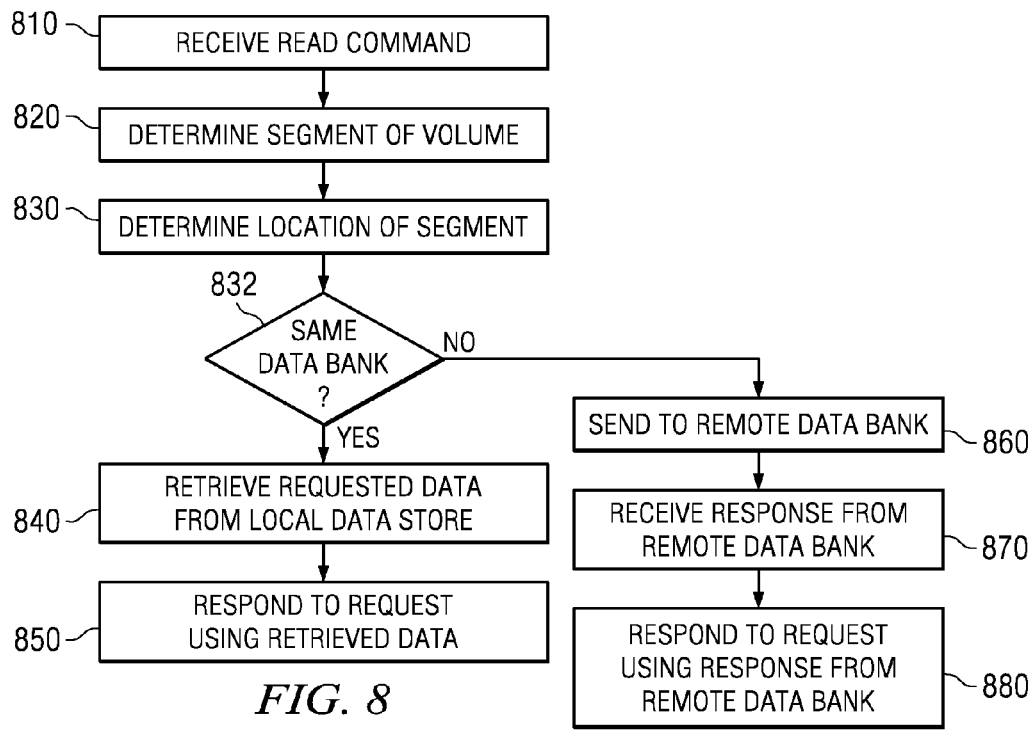
FIG. 8 is a flow diagram of one embodiment of a method implemented by a distributed RAID system.

Looking first at FIG. 8, a flow diagram for one embodiment of a method for implementing a READ command in a distributed RAID system is depicted. This READ command may be sent by a host 102 to a data bank 110 through a switch 120 or from one data bank 110 to another data bank 110. In certain embodiments, host 102 may comprise one or more applications and associated routing information such that a READ command may be routed from the host 102 issuing the command to an appropriate data bank 110 along a path between the issuing host 102 and the appropriate data bank 110. In other cases, however, no such application or routing information may be present on host 102 and thus a READ command issued from a host 102 may be routed to any of data banks 110. It is the latter case that will be illustrated in this embodiment. After reviewing the description of this embodiment, however, it will be noted by those of skill in the art which steps are applicable to the former case as well.

At step 810, then, a READ command may be received at a data bank 110. The distributed RAID application 210 on data bank 110 may determine, at step 820, a segment of a volume which corresponds to a logical address referenced in the received READ command and on which data bank 110 the segment of the volume is stored at step 830. As discussed above, this information may be determined using the global tables 240 associated with the distributed RAID application 210. If the data bank 110 which is storing the segment is the same as the data bank 110 which received the READ command (as determined at step 832) the requested data can be obtained from the appropriate disk 252 of the data store 250 on the receiving data bank 110 at step 840 and at step 850 the READ command responded to. As discussed above, the particular disk 252 of a data store 250 of the data bank 110 on which a segment is stored can be determined using global tables 240 while the location on that disk 252 where the data corresponding to the segment is stored may be determined using local tables 245 which may be used to map a segment of a volume to a physical location on a disk 252. If the receiving data bank 110 received the READ command from the host 102 the host 102 may be responded to while if the receiving data bank 110 received the READ command from another data bank 110 the response may be sent to the distributed RAID application 210 on the data bank 110 which issued the READ command.

If, however, the segment is stored on a remote data bank 110 (a data bank 110 other than the one which received the command) at step 860 the READ command may be sent to the distributed RAID application 210 at the remote data bank 110. In one embodiment, this READ command may be communicated to the distributed RAID application 210 at the remote data bank 110 using a command format utilized by distributed RAID application 210. This command, while providing pertinent information of the original READ command may also instruct the distributed RAID application to return the result of the READ command to the data bank 110 which originally received that READ command, or to perform other functionality. Accordingly, after the READ command is sent to the remote data bank 110 at step 870 a response comprising the requested data may be received from the remote data bank 110 and at step 880 the received READ command responded to using the data received in that response.

Figure 9A:
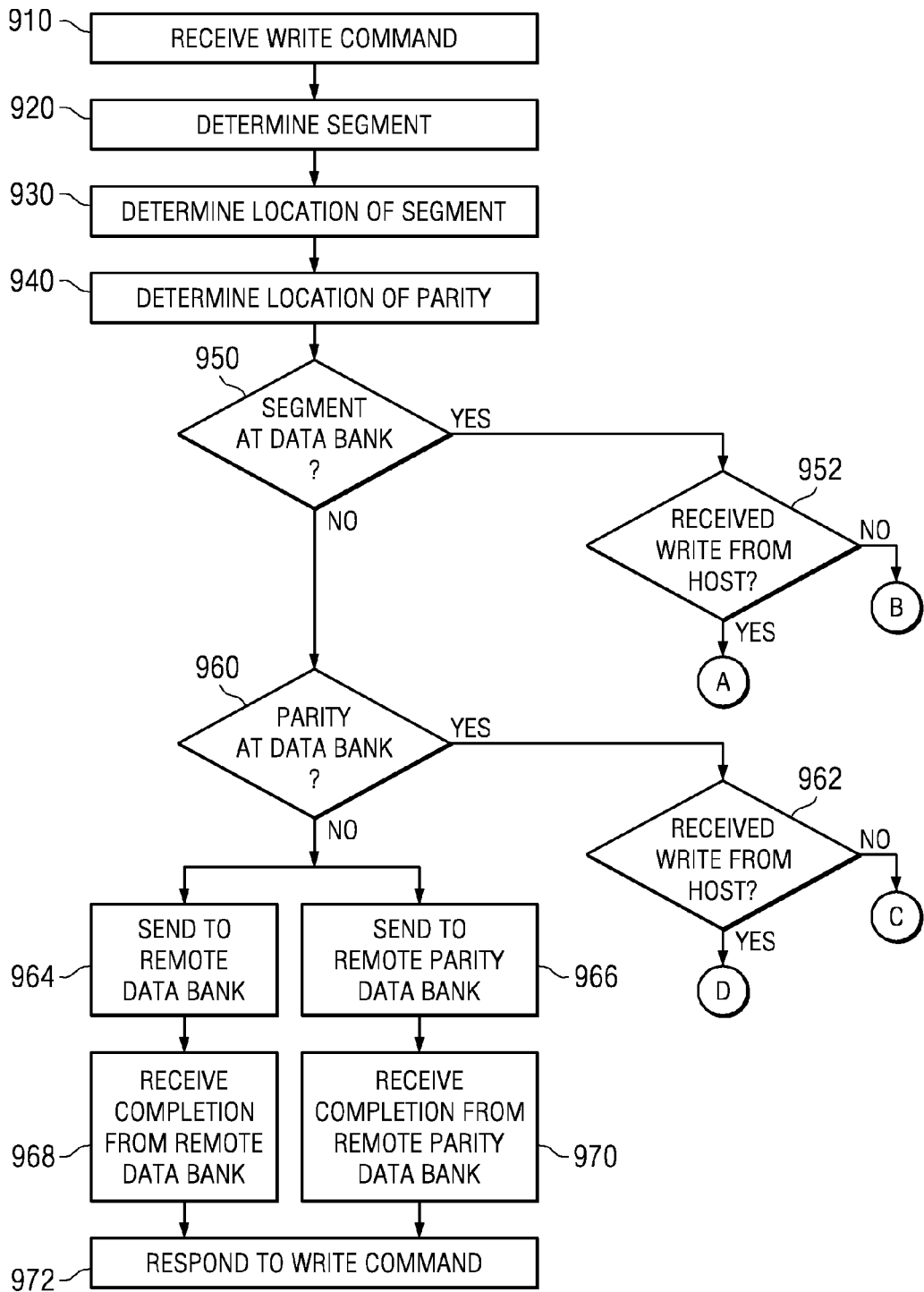
FIG. 9A is a flow diagram of one embodiment of a method implemented by a distributed RAID system.
Figure 9B:
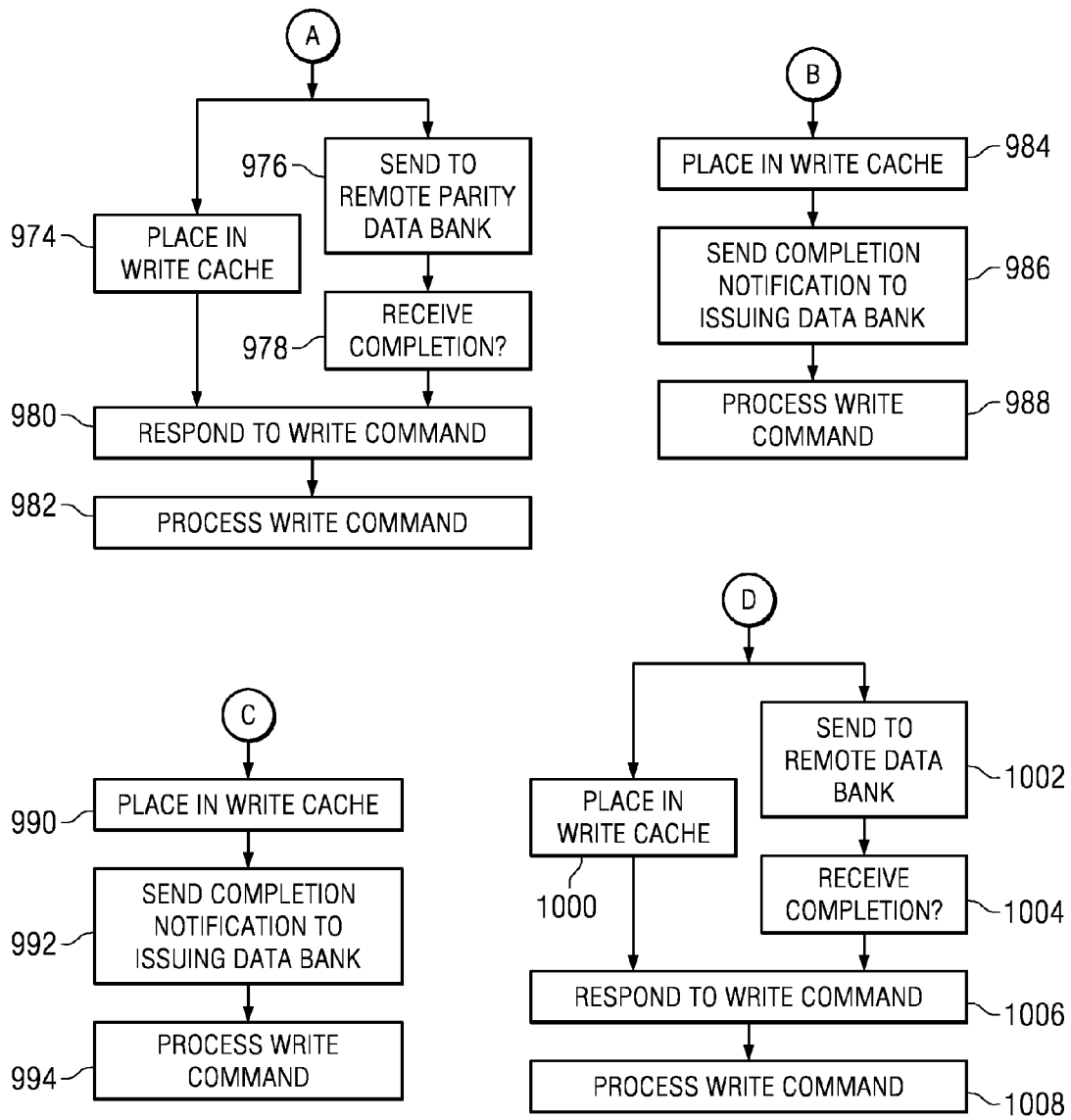
FIG. 9B is a flow diagram of one embodiment of a method implemented by a distributed RAID system.

Moving, now to FIGS. 9A and 9B, a flow diagram for one embodiment of a method for implementing a WRITE command in a distributed RAID system is depicted. This WRITE command may be sent by a host 102 to a data bank 110 through a switch 120 or from one data bank 110 to another data bank 110. In certain embodiments, host 102 may comprise one or more applications and associated routing information such that a WRITE command may be routed from the host 102 issuing the command to an appropriate data bank 110 along a path between the issuing host 102 and an appropriate data bank 110. In other cases, however, no such application or routing information may be present on host 102 and thus a WRITE command issued from a host 102 may be routed to any of data banks 110. It is the latter case that will be illustrated in this embodiment. After reviewing the description of this embodiment, however, it will be noted by those of skill in the art which steps are applicable to the former case as well.

At step 910, then, a WRITE command may be received at a receiving data bank 110. The distributed RAID application 210 on receiving data bank 110 may then determine at steps 920, 930 and 940 the segment of the volume corresponding to a logical address referenced by the WRITE command, the location of that segment (for example, which data banks 110 is storing the data corresponding to that segment) and the location of the parity corresponding to that segment (for example, which data bank 110 is storing the segment where parity data created from the data corresponding to that segment is stored). As discussed above, the location of both the data segment and the parity segment may be determined using global tables 240 stored on the receiving data bank 110.

If neither the data segment (the segment storing the data) nor the redundancy segment (in other words, where the parity or other type of redundancy data created from the data segment) is stored on the receiving data bank 110 (as determined at steps 950 and 960) the WRITE command may be communicated to the distributed RAID application 210 on the remote data bank 110 on which the data segment is stored at step 964 and to the distributed RAID application 210 on the remote parity data bank 110 on which the parity segment is stored at step 966. In one embodiment, this WRITE command may be communicated to the distributed RAID applications 210 at the remote data bank 110 and the remote parity data bank 110 using a command format utilized by distributed RAID applications 210. This command, while providing pertinent information of the original WRITE command may also instruct a distributed RAID application 210 to perform other desired functionality.

Accordingly, after the WRITE command is sent to the remote data bank 110 and the remote parity data bank completion notifications may be received from the distributed RAID applications 210 on the remote data bank 110 and the remote parity data bank 110 at steps 968 and 970. Once these acknowledgments are received the WRITE command may be responded to by the distributed RAID application 210 on the receiving data bank 110.

Returning to step 950, if, however, the data segment is stored at the receiving data bank 110, it may be determined if the WRITE command was received from a host 102 or another data bank 110 at step 952. If the WRITE command was received from a host 102 the WRITE command may be communicated to the distributed RAID application 210 on the remote parity data bank 110 at step 976 and placed in the write cache of the receiving data bank 110 at step 974. After receiving a completion notification from the distributed RAID applications 210 on the remote parity data bank 110 at step 978, the WRITE command may be responded to by the distributed RAID application 210 on the receiving data bank 110 at step 980 (for example, a response sent to the host 102). Furthermore, the WRITE command itself may be processed at step 982. This process may entail the storing of data associated with the WRITE command to the data segment stored on the receiving data bank 110 or other functionality.

On the other hand, if the WRITE command was not received from a host at step 952 this may indicate that the WRITE command was received from another data bank 110 (which, in many cases, may have been the data bank 110 which originally received the WRITE command from a host 102). In this case, the data bank 110 may place the received WRITE command in its write cache at step 984 and sends a completion notification to the issuing data bank 110 at step 986. At some later point then, the WRITE command itself may be processed at step 988.

Returning again to step 950, if the data segment is not stored at the receiving data bank 110 but the parity segment is stored at the receiving data bank 110, as determined at step 960, it may be determined if the WRITE command was received from a host 102 or another data bank 110 at step 962. If the WRITE command was received from a host 102 the WRITE command may be communicated to the distributed RAID application 210 on the remote data bank 110 where the data segment corresponding to the WRITE is stored at step 1002 and placed in the write cache of the receiving data bank 110 at step 1000. After receiving a completion notification from the distributed RAID applications 210 on the remote data bank 110 at step 1004 the WRITE command may be responded to by the distributed RAID application 210 on the receiving data bank 110 at step 1006 and the write command processed at step 1008 by the receiving data bank 110.

Here, processing the write command may entail that the parity segment stored at the receiving data bank 110 may be updated based upon the write command. This update of the parity segment may be accomplished in a variety of ways, not all of which will be elaborated on herein but which will be known to those of ordinary skill in the art. For example, distributed RAID application 210 on parity data bank 110 may perform a backed out write in order to update the parity segment. Performing this backed out write may entail obtaining data segments from which the parity segment and performing logical operations (such as exclusive OR (XOR) operations) using the obtained data segments and the data to be written associated with the WRITE command. Alternatively, if distributed RAID application 210 on receiving data bank 110 has multiple WRITE commands corresponding to each of the data segments from which the parity segment was created, a new parity segment may be calculated and the original parity segment may be updated by replacing it with the newly calculated parity segment. Other methods for updating the parity segment may be realized from a review of the disclosures herein and the particular method utilized to update a parity segment by a distributed RAID application may depend on a variety of factors, including configuration parameters, the availability of certain data (for example, WRITE commands corresponding to all data segments used to create the parity, etc.) or any of a number of other factors.

Returning now to step 962, if the WRITE command was not received from a host this may indicate that the WRITE command was received from another data bank 110 (which, in many cases, may have been the data bank 110 which originally received the WRITE command from a host 102). In this case, the WRITE command may be placed in the write cache of the receiving data bank 110 at step 990 and a completion notification sent to the issuing data bank at step 992. The WRITE command may then be processed at step 994 (for example, the parity segment may be updated as discussed above).

After reviewing the above discussion it will be noted that in many cases, a distributed RAID application 210 at a particular data bank 110 may not be able to process a received WRITE command until notification is received from a parity data bank 110, that a parity data bank may need to evaluate multiple received WRITE commands to determine or implement a method for updating the parity or any of a number of other instances when it may be desired to store one or more WRITE commands or evaluate a set of these stored WRITE commands. To facilitate the storage and evaluation of WRITE (or other) commands, each distributed RAID application 210 may have an associated write cache 260.

Figure 10:
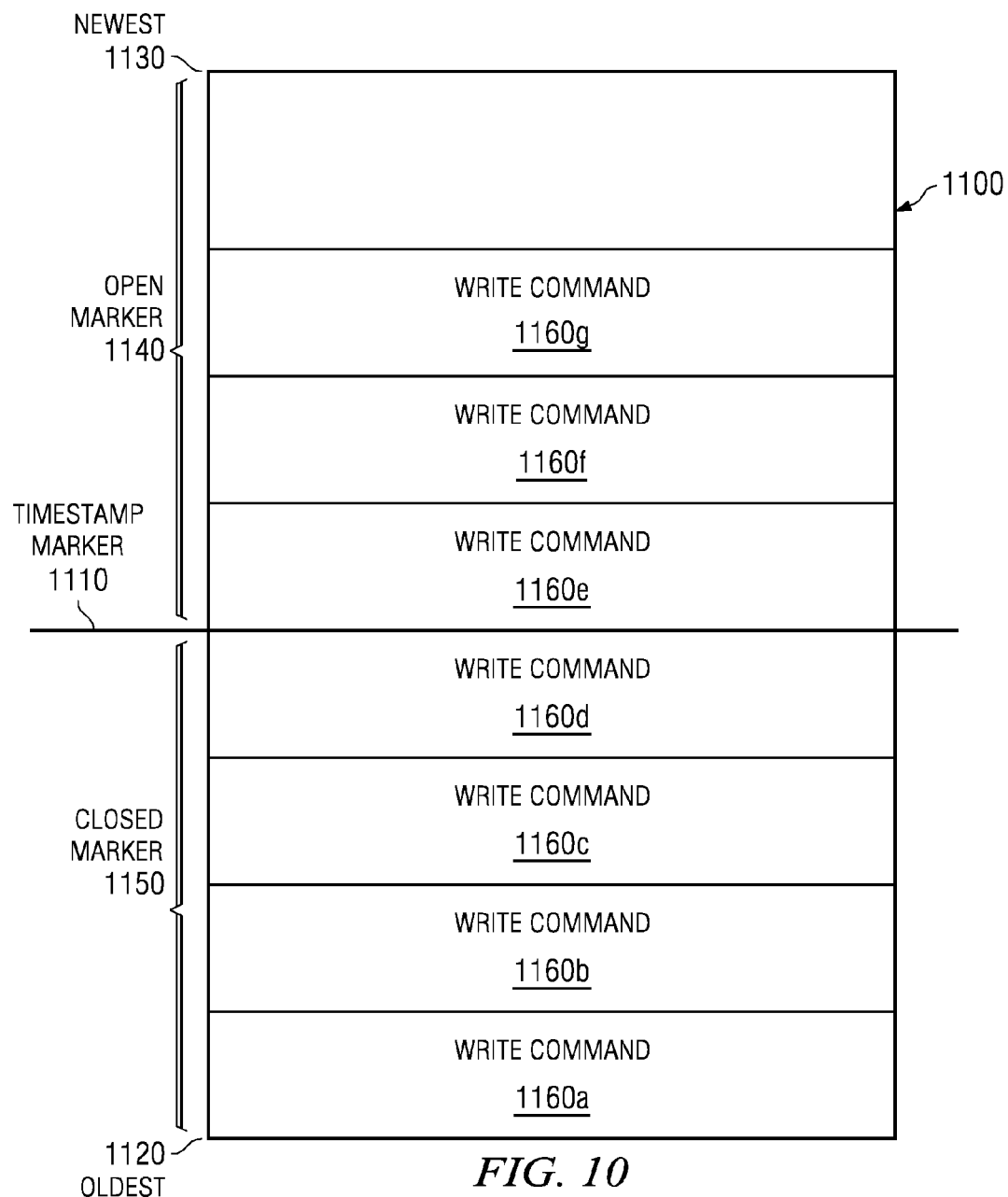
FIG. 10 is a block diagram of one embodiment of a write cache.

A representation of one embodiment of a write cache is depicted in FIG. 10. As WRITE commands are received by distributed RAID application 210 they are placed in write cache 1100. Each of these WRITE commands 1160 may have an associated timestamp indicating when the WRITE command 1160 was received. Thus, in one embodiment write cache 1100 may comprise a queue of time stamped WRITE commands 1160. At some point a timestamp marker may be issued by distributed RAID application 210. This timestamp marker may comprise a time and be communicated to each of distributed RAID applications 210. When to issue a timestamp market may be determined in a variety of ways, such as when the write cache 1100 is a certain percentage full or when a certain number of WRITE commands 1160 have been received, at a certain time interval or a variety of other methodologies.

In any event, this timestamp marker 1110 will segment each of the write caches 1110 associated with each of the distributed RAID applications 210 into at least two segments a closed marker 1150 comprising WRITE commands 1160 received before the timestamp marker 1110 (in this example WRITE commands 1160a, 1160b, 1160c and 1160d) and an open marker 1140 comprising WRITE commands 1160 received after the timestamp marker 1110 (in this example WRITE commands 1160e, 1160f and 1160g). Distributed RAID application 210 may then evaluate the set of WRITE commands 1160 in the closed marker 1150 (in this example WRITE commands 1160a, 1160b, 1160c and 1160d) to determine how these WRITE commands 1160 are to be processed while received WRITE commands may still be added to open marker 1140.

Conversely, as the closed marker 1150 comprises a set of WRITE commands which are no longer changing distributed RAID application may evaluate this set of WRITE commands 1160 with respect to one another (or other criteria) to determine an order of execution (and may therefore reorder WRITE commands 1160 in closed marker 1160), a methodology to update a parity segment (for example, if there are WRITE commands in closed marker 1150 which correspond to each data segment used to create a parity) or make other determinations associated with the processing of WRITE commands 1160. It will be noted that as a timestamp marker 1110 may be issued for multiple reasons by any of distributed RAID applications 210 on each of data banks 110, multiple closed markers may exist at any one point, for example, when multiple timestamp markers 1110 are issued by distributed RAID applications 210 between the time the write cache is evaluated by any one of the distributed RAID applications 210.

After reviewing the above the reader may now have an understanding of how distributed RAID applications 210 on data banks 110 operate in tandem to achieve virtualized storage and RAID implementation. It may be further helpful to an understanding to certain embodiments, however, to discuss the functioning of certain embodiments of distributed RAID application 210 after the occurrence of a fault. As discussed above, distributed RAID application 210 may be aware (for example, have stored) of a data bank which is faulty (in other words, which may have a hardware, software, communication or other fault which impedes or hampers the ability of the data bank 110 to operate or access data). Distributed RAID application 210 may be able to account for such faults while satisfying commands from hosts 102.

Figure 11:
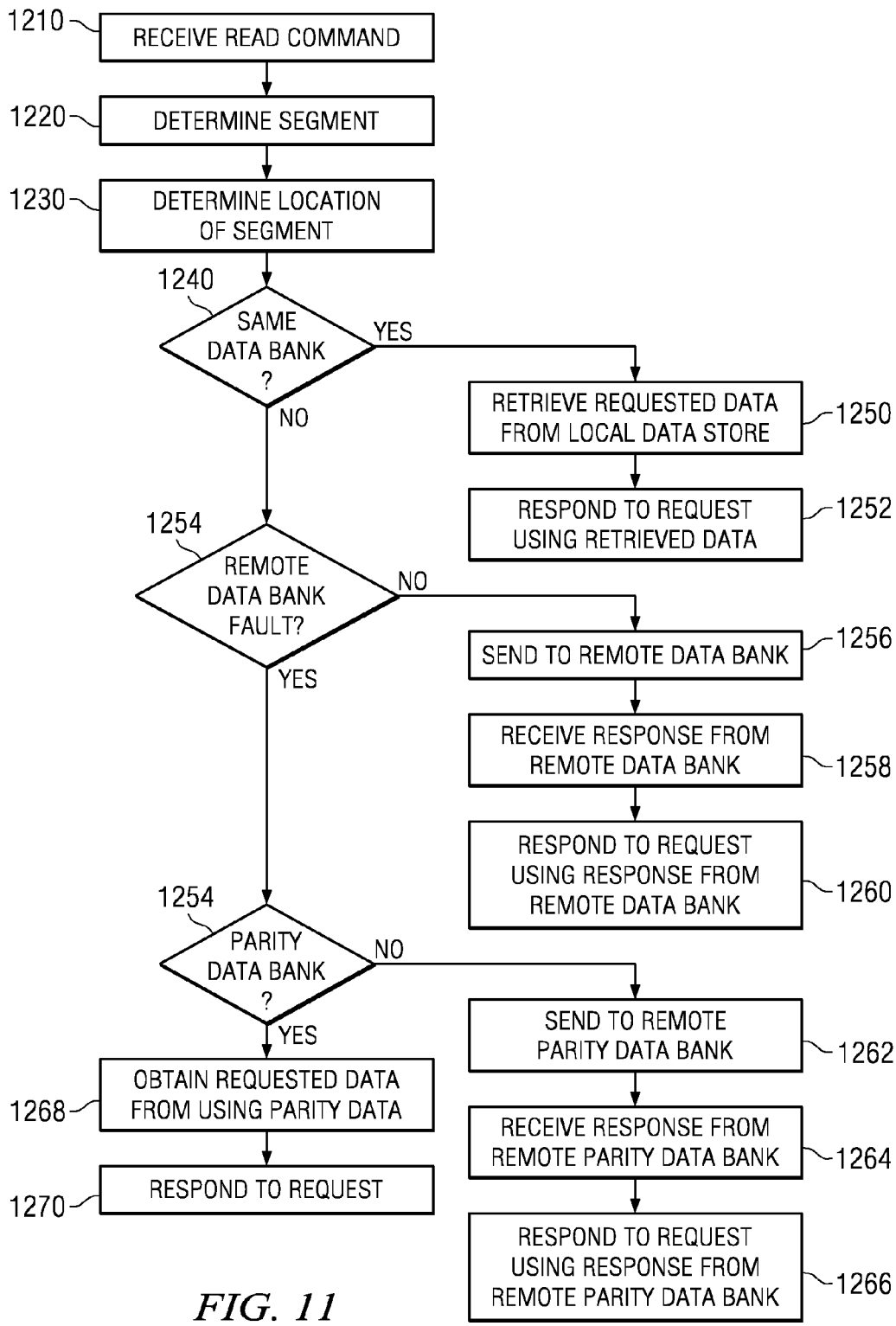
FIG. 11 is a flow diagram of one embodiment of a method implemented by a distributed RAID system.

To illustrate, FIG. 11 depicts a flow diagram for one embodiment of a method for implementing a READ command in a distributed RAID system. It will be understood that this method applies to an embodiment where RAID 5 has been implemented in conjunction with a range of a volume and that other embodiments may be equally well applied in cases where other levels (or no level) of RAID have been implemented. The READ command may be sent by a host 102 to a data bank 110 through a switch 120 or from another data bank 110 to the receiving data bank 110. At step 1110, then, a READ command may be received at a data bank 110. The distributed RAID application 210 on data bank 110 may determine, at step 1220, a data segment which corresponds to a logical address referenced in the received READ command and on which data bank 110 the data segment is stored at step 1230. If the data bank 110 which is storing the data segment is the same as the data bank 110 which received the READ command (as determined at step 1240) the requested data can be obtained from the appropriate disk 252 of the data store 250 on the receiving data bank 110 at step 1250 and the received READ command responded to using the obtained data at step 1252. If the receiving data bank 110 received the READ command from the host 102 the host 102 may be responded to while if the receiving data bank 110 received the READ command from another data bank 110 the response may be sent to the distributed RAID application 210 on the data bank 110 which issued the READ command.

If, however, the data segment is stored on a remote data bank 110 (a data bank 110 other than the one which received the command) at step 1254 it may be determined if the remote data bank 110 on which the data segment to be read is stored has experienced a fault. If not the READ command may be sent to the distributed RAID application at the remote data bank 110. After a response comprising the requested data is received from the remote data bank 110 at step 1258 the received READ command may be responded to using that data at step 1260.

If the remote data bank 110 has experienced a fault, however, it may be determined at step 1254 if the receiving data bank 110 holds the parity segment corresponding to the data segment associated with the READ command. If the parity segment is stored at the receiving data bank 110 the data segment corresponding to the READ command may be obtained using the parity segment stored at the receiving data bank 110. Obtaining the data segment from the parity data may be accomplished in a variety of way which will not be elaborated on in more detail, including obtaining the other data segments (data segments other than the one corresponding to the READ command) from other data banks 110 and obtaining the desired data segment by performing logical operations between the other data segment and the parity segments. Once the requested data segment has been obtained using the parity data at step 1268 the received READ command may be responded to at step 1270. If the receiving data bank 110 received the READ command from the host 102 the host 102 may be responded to while if the receiving data bank 110 received the READ command from another data bank 110 the response may be sent to the distributed RAID application 210 on the data bank 110 which issued the READ command.

If the receiving data bank 110 is not the data bank 110 storing the parity block a READ command may be sent to the remote data bank 110 on which the parity segment corresponding to the data segment referenced in the READ command is stored at step 1262. After a response comprising the requested data is received from the remote parity data bank 110 at step 1264 the received READ command may be responded to using that data at step 1266.

Figure 12:
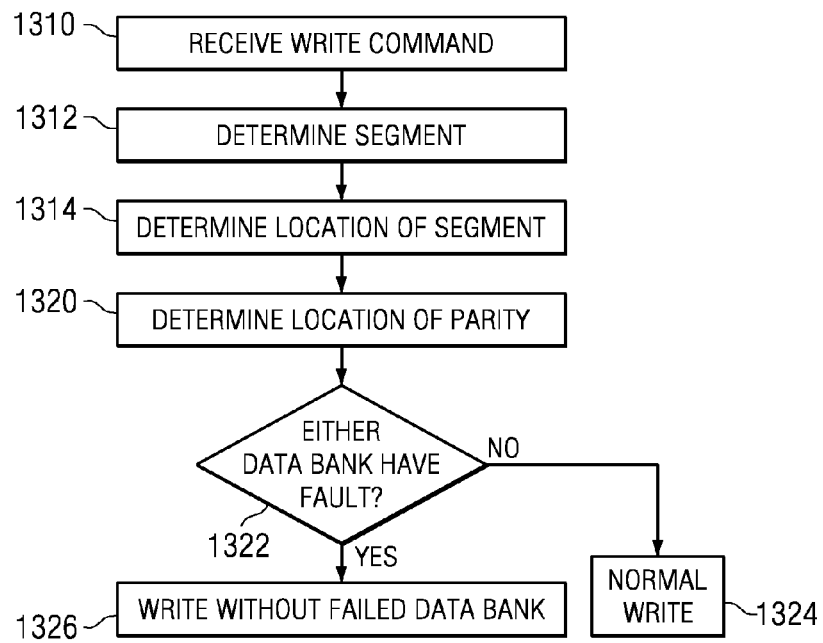
FIG. 12 is a flow diagram of one embodiment of a method implemented by a distributed RAID system.

Moving on to FIG. 12, a flow diagram for one embodiment of a method for implementing a WRITE command in a distributed RAID system is depicted. This WRITE command may be sent by a host 102 to a data bank 110 through a switch 120 or from one data bank 110 to another data bank 110. At step 1310, then, a WRITE command may be received at a receiving data bank 110. The distributed RAID application 210 on receiving data bank 110 may then determine at steps 1312, 1314 and 1320 the data segment corresponding to a logical address referenced by the WRITE command, the location of that data segment (for example, which data banks 110 is storing the data corresponding to that segment) and the location of the parity segment corresponding to that data segment (for example, which data bank 110 is stores the segment where parity data created from the data corresponding to that segment is stored). As discussed above, the location of both the data segment and the parity segment may be determined using the set of tables 240 stored on the receiving data bank 110.

It can then be determined if either the data bank 110 on which the data segment is stored or the data bank 110 on which the parity segment is stored have experienced a fault. If neither of those data banks 110 has experience a fault a normal write operation may be carried out at step 1324 by the distributed RAID application. A normal write operation has been discussed previously with respect to FIGS. 9A and 9B and will not be discussed further.

If however, either of those data banks 110 has experienced a fault a write operation taking into consideration the failed data bank 110 may be conducted at step 1326. This write operation may parallel substantially identically the write operation described with respect to FIGS. 9A and 9B with the exception that before a write command is sent to a data bank 110 it is determined if the data bank 110 to which the write is to be sent is failed and if so that write command is not sent to the failed data bank 110. In all other respects the write operation is substantially identical.

After reviewing the aforementioned flow diagrams the operation of certain embodiments may be better understood with reference to specific examples of one embodiment of a distributed RAID system in operation. To that end, attention is directed back to FIG. 4 which illustrates one embodiment of a distributed RAID system with five data banks 110. To begin with a first example, suppose that host 102b issues a READ command to data bank 110c, where the READ command references a logical address which corresponds to data segment "2" 402c on data bank 110a. Here, distributed RAID application 210c on data bank 110c may determine that the logical address of the received READ command references data segment "2" 402c and that data segment "2" 402c is stored on data bank 110a. Distributed RAID application 210c may then send a corresponding READ command to data bank 110a.

Distributed RAID application 210a on data bank 110a may receive this READ command, determine that the READ command references a logical address which corresponds to data segment "2" 402c and that data segment "2" 402c is located on the data bank 110a on which it is executing. Distributed RAID application 210a may then access data store 250a to obtain the data requested from data segment "2" 402c and return this obtained data to the distributed RAID application 210c at issuing data bank 110c. Distributed RAID application 210c on data bank 110c may receive this response from distributed RAID application 210a on data bank 110a and use data from this response to respond to the original READ command issued from host 102b.

Now suppose that host 102b issues a READ command to data bank 110c, where the READ command references a logical address which corresponds to data segment "2" 402c on data bank 110a, but that data bank 110a has experience a fault and is no longer operating. In this case, distributed RAID application 210c on data bank 110c may determine that the logical address of the received READ command references data segment "2" 402c and that data segment "2" 402c is stored on data bank 110a. Additionally, distributed RAID application 210c on data bank 110c may also determine that data bank 110a has experienced a fault.

Accordingly, distributed RAID application 210c may determine that the location of parity segment 402j corresponding to data segment "2" 402c is data bank 110e. Distributed RAID application 210c may then send a READ command to data bank 110e. Distributed RAID application 210e on data bank 110e may receive this READ command, determine that the READ command references a logical address which corresponds to data segment "2" 402c and that the parity segment 402j corresponding to data segment "2" 402c is located on the data bank 110e on which it is executing. Distributed RAID application 210e may then access data store 250e to access parity segment 402j and obtain the data requested from data segment "2" 402c using the parity segment 402j. This obtained data may be returned to the distributed RAID application 210c at issuing data bank 110c. It will be noted that distributed RAID application 210e may need other data to determine the data requested for data segment "2" 402c. Accordingly, distributed RAID application 210e may determine that the location of data segment "0" 402a, data segment "1" 402b and data segment "3" 402d which were used in conjunction with data segment "2" 402c to create parity segment 402j are located respectively on data banks 110b, 110d and 110c. Distributed RAID application 210e may thus obtain data segment "0" 402a, data segment "1" 402b and data segment "3" 402d by sending READ requests to these data banks 110b, 110d and 110c and use data segment "0" 402a, data segment "1" 402b and data segment "3" 402d in conjunction with parity segment 402j to obtain the data requested from data segment "2" 402c.

Distributed RAID application 210c on data bank 110c may receive the response from distributed RAID application 210e on data bank 110e and use data from this response to respond to the original READ command issued from host 102b. In this manner, data corresponding to a data segment can still be read by a host despite the occurrence of a fault in the distributed RAID system.

Continuing on with WRITE commands, suppose that host 102b issues a WRITE command to data bank 110c, where the WRITE command references a logical address which corresponds to data segment "2" 402c on data bank 110a. Here, distributed RAID application 210c on data bank 110c may determine that the logical address of the received WRITE command references data segment "2" 402c and that data segment "2" 402c is stored on data bank 110a. Furthermore, distributed RAID application 210c may determine that the parity segment 402j corresponding to data segment "2" 402c is located on data bank 110e. Distributed RAID application 210c may then send a corresponding WRITE command to data banks 110a and 110e. Upon receiving completion notifications from distributed RAID applications 210a and 210e, distributed RAID application 210c may respond to the originally received WRITE command.

Distributed RAID application 210e on data bank 110e may receive its corresponding WRITE command, determine that the WRITE command references a logical address which corresponds to data segment "2" 402c and that the parity segment 402j corresponding to data segment "2" 402c is located on the data bank 110e on which it is executing. Distributed RAID application 210e may place the WRITE command in its write cache and send a completion notification to data bank 110c. Distributed RAID application 210e may then access data store 250e to access parity segment 402j and update the parity segment 402j using the data referenced in the received WRITE command.

Distributed RAID application 210a on data bank 110a may receive its corresponding WRITE command, determine that the WRITE command references a logical address which corresponds to data segment "2" 402c and that data segment "2" 402c is located on the data bank 110a on which it is executing. Distributed RAID application 210a may place the WRITE command in its write cache and send a completion notification to data bank 110c. Distributed RAID application 210a may then access data store 250a to update the segment "2" 402c using the data referenced in the received WRITE command.

Again suppose now that host 102b issues a WRITE command to data bank 110c, where the WRITE command references a logical address which corresponds to data segment "2" 402c on data bank 110a, but that data bank 110a has experience a fault and is no longer operating. In this case, distributed RAID application 210c on data bank 110c may determine that the logical address of the received WRITE command references data segment "2" 402c and that data segment "2" 402c is stored on data bank 110a. Additionally, distributed RAID application 210c on data bank 110c may also determine that data bank 110a has experienced a fault. Furthermore, distributed RAID application 210c may determine that the parity segment 402j corresponding to data segment "2" 402c is located on data bank 110e. Distributed RAID application 210c may then send a corresponding WRITE command to data bank 110e. Upon receiving a completion notification from distributed RAID applications 210e distributed RAID application 210c may respond to the originally received WRITE command.

Distributed RAID application 210e on data bank 110e may receive the corresponding WRITE command, determine that the WRITE command references a logical address which corresponds to data segment "2" 402c and that the parity segment 402j corresponding to data segment "2" 402c is located on the data bank 110e on which it is executing. Distributed RAID application 210e may place the WRITE command in its write cache and send a completion notification to data bank 110c. Distributed RAID application 210e may then access data store 250e to access parity segment 402j and update the parity segment 402j using the data referenced in the received WRITE command. In this manner, data corresponding to a data segment can still be written by a host despite the occurrence of a fault in the distributed RAID system.

In the foregoing specification, the invention has been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component of any or all the claims.

What is claimed is:

1. A system for implementing distributed RAID, comprising:
    a plurality of storage appliances, each storage appliance coupled to each of the other plurality of storage appliances, each storage appliance including:
    a processor;
    a data store;
    an engine embodied on non-transitory computer readable medium comprising instructions executable by the processor to cause the engine to: receive a command corresponding to a segment of a volume, wherein:
    the volume comprises a set of segments stored on the plurality of storage appliances according to a storage appliance order comprising an order of the plurality of storage appliances including each of the plurality of storage appliances exactly once, and
    wherein redundancy data corresponding to a RAID level implemented in conjunction with the volume is stored on each of the plurality of storage appliances based on the location of the set of segments and the storage appliance order such that for each segment of the volume a corresponding redundancy segment of one or more redundancy segments comprising redundancy data associated with that segment of the volume does not reside on the same storage appliance as the corresponding segment of the volume.

2. The system of claim 1, wherein different volumes are allotted, with one or more of the volumes implemented in conjunction with different RAID levels.

3. The system of claim 2, further comprising:
substantially identical distributed RAID applications distributed across the plurality of storage appliances for distributing control across the plurality of storage appliances.

4. The system of claim 3, wherein each of the plurality of storage appliances having a corresponding copy of the distributed RAID application for coordination of storage and implementation of the distributed RAID.

5. The system of claim 4, wherein each of the distributed RAID applications on each of the plurality of storage appliances are configured to execute substantially autonomously.

6. The system of claim 4, wherein each of the distributed RAID applications on each of the plurality of storage appliances coordinate among themselves to distribute and control data flow associated with implementing the RAID level in conjunction with data stored on an associated volume of each of the plurality of storage appliances.

7. The system of claim 4, further comprising:
one or more hosts, wherein the distributed RAID is configured to operate in a seamless manner with respect to each of the one or more hosts utilizing the distributed RAID when one or more of the plurality of storage appliances are lost.

8. The system of claim 7, wherein each of the one or more hosts coupled to a switch and each of the plurality of storage appliances coupled to the switch.

9. The system of claim 2, wherein the distributed RAID is configured such that a volume associated with the RAID level may be created using the distributed RAID so that each of the distributed RAID applications can coordinate operations associated with data of that volume such that data associated with that volume or the implementation of the RAID level in conjunction with that volume can be stored on multiple storage appliances of the plurality of storage appliances of the distributed RAID.

10. A method for distributed RAID implemented on a plurality of storage appliances, each storage appliance coupled to each of the other storage appliances of the plurality of storage appliances, comprising:
receiving a command corresponding to a segment of a volume, wherein:
the volume comprises a set of segments, and the set of segments of the volume are stored on the plurality of storage appliances according to a storage appliance order, where the storage appliance order comprising an order of the plurality of storage appliances including each of the plurality of storage appliances exactly once, and wherein
redundancy data corresponding to a RAID level implemented in conjunction with the volume is stored on each of the plurality of storage appliances, such that for each segment of the volume a corresponding redundancy segment of one or more redundancy segments comprising redundancy data associated with that segment of the volume does not reside on the same storage appliance as the corresponding segment of the volume; and
executing the command on a particular storage appliance of the plurality of storage appliances based on receipt of the command at the particular storage appliance of the plurality of storage appliances and a relationship of the segment to the particular storage appliance of the plurality of storage appliances.

11. The method of claim 10, wherein executing the command further comprising:
determining a storage appliance of the plurality of storage appliances, wherein the storage appliance corresponds to the segment; and
if the storage appliance is the particular storage appliance which received the command executing the command with respect to the segment, and if not, forwarding the command to the particular storage appliance.

12. The method of claim 10, further comprising:
allotting different volumes, with one or more of the volumes implemented in conjunction with different RAID levels.

13. The method of claim 10, further comprising:
distributing substantially identical distributed RAID applications across the plurality of storage appliances for distributing control across the plurality of storage appliances.

14. The method of claim 13, further comprising:
storing a corresponding copy of the distributed RAID application on each of the plurality of storage appliances for coordination of storage and implementation of the distributed RAID.

15. The method of claim 13, further comprising:
configuring each of the distributed RAID applications on each of the plurality of storage appliances to execute substantially autonomously.

16. The method of claim 13, further comprising:
configuring each of the distributed RAID applications on each of the plurality of storage appliances to coordinate among themselves to distribute and control data flow associated with implementing the RAID level in conjunction with data stored on an associated volume of each of the plurality of storage appliances.

17. The method of claim 13, further comprising:
configuring the distributed RAID such that a volume associated with the RAID level may be created using the distributed RAID so that each of the distributed RAID applications can coordinate operations associated with data of that volume such that data associated with that volume or the implementation of the RAID level in conjunction with that volume can be stored on multiple storage appliances of the plurality of storage appliances of the distributed RAID.

18. The method of claim 10, further comprising:
configuring the distributed RAID to operate in a seamless manner with respect to each of one or more hosts utilizing the distributed RAID when one or more of the plurality of storage appliances are lost, wherein each of the one or more hosts coupled to a switch and each of the plurality of storage appliances coupled to the switch.

19. A non-transitory computer readable medium comprising computer executable instructions for implementing distributed RAID on a plurality of storage appliances, each storage appliance coupled to each of the other storage appliances of the plurality of storage appliances, the computer instructions executable for:
receiving a command corresponding to a segment of a volume, wherein:
the volume comprises a set of segments, and the set of segments of the volume are stored on the plurality of storage appliances according to a storage appliance order, where the storage appliance order comprising an order of the plurality of storage appliances including each of the plurality of storage appliances exactly once, and wherein redundancy data corresponding to a RAID level implemented in conjunction with the volume is stored on each of the plurality of storage appliances, such that for each segment of the volume a corresponding redundancy segment of one or more redundancy segments comprising redundancy data associated with that segment of the volume does not reside on the same storage appliance as the corresponding segment of the volume; and executing the command on a particular storage appliance of the plurality of storage appliances based on receipt of the command at the particular storage appliance of the plurality of storage appliances and a relationship of the segment to the particular storage appliance of the plurality of storage appliances.

20. The non-transitory computer readable medium of claim 19, wherein executing the command further comprising:

determining a storage appliance of the plurality of storage appliances, wherein the storage appliance corresponds to the segment; and if the storage appliance is the particular storage appliance which received the command executing the command with respect to the segment, and if not, forwarding the command to the particular storage appliance.

21. The non-transitory computer readable medium of claim 19, the computer instructions further executable for:

allotting different volumes, with one or more of the volumes implemented in conjunction with different RAID levels.

22. The non-transitory computer readable medium of claim 19, the computer instructions further executable for:

distributing substantially identical distributed RAID applications across the plurality of storage appliances for distributing control across the plurality of storage appliances.

23. The non-transitory computer readable medium of claim 22, the computer instructions further executable for:

storing a corresponding copy of the distributed RAID application on each of the plurality of storage appliances for coordination of storage and implementation of the distributed RAID.

24. The non-transitory computer readable medium of claim 22, the computer instructions further executable for:

configuring each of the distributed RAID applications on each of the plurality of storage appliances to execute substantially autonomously.

25. The non-transitory computer readable medium of claim 22, the computer instructions further executable for:

configuring each of the distributed RAID applications on each of the plurality of storage appliances to coordinate among themselves to distribute and control data flow associated with implementing the RAID level in conjunction with data stored on an associated volume of each of the plurality of storage appliances.

26. The non-transitory computer readable medium of claim 22, the computer instructions further executable for:

configuring the distributed RAID such that a volume associated with the RAID level may be created using the distributed RAID so that each of the distributed RAID applications can coordinate operations associated with data of that volume such that data associated with that volume or the implementation of the RAID level in conjunction with that volume can be stored on multiple storage appliances of the plurality of storage appliances of the distributed RAID.

27. The non-transitory computer readable medium of claim 19, the computer instructions further executable for:

configuring the distributed RAID to operate in a seamless manner with respect to each of one or more hosts utilizing the distributed RAID when one or more of the plurality of storage appliances are lost, wherein each of the one or more hosts coupled to a switch and each of the plurality of storage appliances coupled to the switch.

\* \* \* \* \*